United States Patent
Zhou et al.

(10) Patent No.: US 11,962,517 B2
(45) Date of Patent: Apr. 16, 2024

(54) COMMUNICATIONS METHOD, APPARATUS, AND SYSTEM FOR RECOVERING LOST PACKETS

(71) Applicant: HUAWEI TECHNOLOGIES CO., LTD., Shenzhen (CN)

(72) Inventors: Xingwang Zhou, Nanjing (CN); Feng Li, Nanjing (CN); Yizhou Li, Nanjing (CN); Jianfei He, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 198 days.

(21) Appl. No.: 17/412,398

(22) Filed: Aug. 26, 2021

(65) Prior Publication Data

US 2021/0385173 A1 Dec. 9, 2021

Related U.S. Application Data

(63) Continuation of application No. PCT/CN2020/076065, filed on Feb. 20, 2020.

(30) Foreign Application Priority Data

Feb. 26, 2019 (CN) .......................... 201910142936.0

(51) Int. Cl.
| | | |
|---|---|---|
| H04L 12/28 | (2006.01) | |
| H04L 47/11 | (2022.01) | |
| H04L 49/55 | (2022.01) | |
| H04L 45/64 | (2022.01) | |

(52) U.S. Cl.
CPC ............ *H04L 49/557* (2013.01); *H04L 47/11* (2013.01); *H04L 49/555* (2013.01); *H04L 45/64* (2013.01)

(58) Field of Classification Search
CPC ......... H04L 45/64; H04L 47/11; H04L 49/557
See application file for complete search history.

(56) References Cited

U.S. PATENT DOCUMENTS

| | | | | |
|---|---|---|---|---|
| 6,466,964 | B1 * | 10/2002 | Leung ............... | H04W 12/0431 |
| | | | | 709/225 |
| 8,547,846 | B1 * | 10/2013 | Ma .......................... | H04L 47/12 |
| | | | | 370/413 |
| 9,712,289 | B2 * | 7/2017 | Jorgensen ................ | H04L 9/40 |

(Continued)

FOREIGN PATENT DOCUMENTS

| CN | 101534520 A | 9/2009 |
|---|---|---|
| CN | 104038322 A | 9/2014 |

(Continued)

*Primary Examiner* — Elisabeth Benoit Magloire
(74) *Attorney, Agent, or Firm* — Rimon PC

(57) ABSTRACT

This application discloses a communications method and related communications apparatus and system. The method includes recovering, by a first node, when detecting that a first packet is lost, the first packet according to a local recovery mechanism. The first packet is a packet obtained based on a packet sent by at least one first terminal to at least one second terminal, and the first node is a node on a network path between each first terminal and a second terminal communicating with the first terminal. The method further includes adding a first identification information related to local recovery, and sending the first packet. This application can reduce a transmission delay and improve transmission efficiency.

16 Claims, 25 Drawing Sheets

(56) References Cited

U.S. PATENT DOCUMENTS

| | | | |
|---|---|---|---|
| 2002/0136219 A1* | 9/2002 | Ding | H04N 21/2365 375/E7.277 |
| 2003/0112754 A1* | 6/2003 | Ramani | H04L 47/10 370/349 |
| 2009/0003216 A1* | 1/2009 | Radunovic | H04L 45/123 370/237 |
| 2010/0050040 A1 | 2/2010 | Samuels et al. | |
| 2012/0120801 A1 | 5/2012 | Ramakrishnan et al. | |
| 2013/0223334 A1 | 8/2013 | Guo et al. | |
| 2013/0329557 A1* | 12/2013 | Petry | H04L 41/00 370/235 |
| 2014/0079059 A1* | 3/2014 | Amir | H04L 45/38 370/390 |
| 2015/0195202 A1* | 7/2015 | Ogura | H04W 28/02 370/236 |
| 2016/0119086 A1 | 4/2016 | Le et al. | |
| 2016/0192233 A1* | 6/2016 | Sarker | H04L 47/263 370/236 |
| 2017/0111252 A1* | 4/2017 | Cervantes | H04L 43/0852 |
| 2018/0316614 A1* | 11/2018 | Liu | H04L 43/0894 |
| 2019/0014053 A1* | 1/2019 | Huang | H04L 47/33 |
| 2019/0260679 A1* | 8/2019 | Eastlake, III | H04L 69/22 |
| 2019/0319889 A1* | 10/2019 | Zhang | H04L 69/22 |

FOREIGN PATENT DOCUMENTS

| | | |
|---|---|---|
| JP | 2007208635 A | 8/2007 |
| WO | 2015048999 A1 | 4/2015 |

* cited by examiner

COMMUNICATIONS METHOD, APPARATUS, AND SYSTEM FOR RECOVERING LOST PACKETS

CROSS-REFERENCE TO RELATED APPLICATIONS

This application is a continuation of International Application No. PCT/CN2020/076065, filed on Feb. 20, 2020, which claims priority to Chinese Patent Application No. 201910142936.0, filed on Feb. 26, 2019. The disclosures of the aforementioned applications are hereby incorporated by reference in their entireties.

TECHNICAL FIELD

This application relates to the communications field, and especially, to a communications method, apparatus, and system.

BACKGROUND

An overlay network is a virtual network overlaying on a physical network. The overlay network may greatly improve performance of end-to-end transmission control protocol (TCP) transmission. In the physical network on which the overlay network overlays, when sending a packet to a receive end, a transmit end may send packets whose packet sequence numbers are consecutive to a node in the overlay network. The consecutive packets are transmitted to the receive end through the node in the overlay network.

A packet may be lost when the consecutive packets are transmitted through the overlay network. In such case, the receive end determines the sequence number of the lost packet based on the received packets, and sends the sequence number of the lost packet to the transmit end. Then, the transmit end re-sends, to the receive end, the packet corresponding to the sequence number of the lost packet.

When a packet is lost, the transmit end does not re-transmit the lost packet until the receive end feeds back the sequence number of the lost packet. After receiving the sequence number of the lost packet, the transmit end resends the lost packet to the receive end. This increases the transmission delay of re-transmitting the lost packet.

SUMMARY

To reduce transmission delay, embodiments of this application provide a communications method, apparatus, and system. The technical solutions are as follows.

According to a first aspect, this application provides a communications method, where the method includes: recovering, by a first node when detecting that a first packet is lost, the first packet according to a local recovery mechanism, where the first packet is a packet obtained based on a packet sent by at least one first terminal to at least one second terminal, and the first node is a node on a network path between each first terminal and a second terminal communicating with the first terminal; adding a first identification information related to local recovery; and sending the first packet. When the first packet is lost, the first node recovers, according to the local recovery mechanism, the first packet and sends the first packet. In this case, the first node does not need to wait for the first terminal to resend the first packet to the second terminal, and this reduces a transmission delay and improves transmission efficiency. In addition, the first packet includes the first identification information, and the first identification information may be transmitted to the first terminal. The first terminal accurately determines a current status of a network based on the first identification information, and sends a packet based on the accurately determined network status. This further improves transmission efficiency. Moreover, as the first packet includes the first identification information related to the local recovery, the first terminal may be notified, through the first identification information, that the first packet is recovered by the first node by performing the local recovery.

In a possible implementation of the first aspect, the first identification information is used to identify that the first packet is a packet recovered according to the local recovery mechanism, the first identification information is used to identify a quantity of times for which the first packet is recovered, or the first identification information is used to identify that a current network status indicates network congestion. The first terminal may be notified, through the first identification information, that the first packet is recovered by the first node by performing the local recovery.

In a possible implementation of the first aspect, the first node receives the first packet and sends the first packet to a second node, where the second node is another node, other than the first node, on a network path between each first terminal and a second terminal communicating with the first terminal. The first node detects, according to a packet acknowledgment mechanism, whether the first packet is lost in a process of transmitting the first packet to the second node. In this way, a packet loss can be detected.

In a possible implementation of the first aspect, the first node adds the first identification information to the first packet, when a quantity of times for which the first packet is recovered reaches a preset quantity threshold, when network status information monitored by the first node indicates network congestion, or when a depth of a forwarding queue on the first node exceeds a preset depth threshold. When the network status is congestion, the first identification information is added to the first packet, so that the first terminal can accurately determine the current network status based on the first identification information. In addition, when the quantity of times for which the first packet is recovered reaches the preset quantity threshold, it indicates that a quantity of times for which the packet is lost on the network is greater than or equal to the preset quantity threshold, and the network is indeed congested. The first terminal reduces a packet sending rate when detecting that the first packet is lost, and adds the first identification information to the first packet. After obtaining the first identification information, the first terminal continues to reduce the packet sending rate. When the quantity of times for which the first packet is recovered does not reach the preset quantity threshold, it indicates that the quantity of times for which the packet is lost on the network is less than the preset quantity threshold, and the network may be congested or not congested. When no congestion occurs, the quantity of times for which the first packet is recovered does not reach the preset quantity threshold. In this case, the first identification information is not added to the first packet. When receiving the first packet, the second terminal sends a first feedback packet to the first terminal, where the first feedback packet does not include the first identification information. When receiving the first packet sent by the first terminal, the second terminal sends a second feedback packet to the first terminal. Because the first feedback packet does not include the first identification information, the first terminal recovers a service packet sending rate when receiving the second feedback packet, and this improves transmission efficiency.

It should be further noted that, when the depth of the forwarding queue on the first node exceeds the preset depth threshold, the current network status indicates network congestion. Therefore, the first node adds the first identification information to the first packet when the network status information monitored by the first node indicates network congestion, or when the depth of the forwarding queue on the first node exceeds the preset depth threshold. In this case, when the first identification information is transmitted to the first terminal, the first terminal accurately determines the current network status based on the first identification information, and sends the packet based on the accurately determined network status. This further improves the transmission efficiency.

In a possible implementation of the first aspect, the first node obtains the first packet based on a received redundant packet and a received service packet, where the service packet and the first packet are packets obtained based on a packet sent by the at least one first terminal to the at least one second terminal, and the redundant packet includes redundant information of the packet sent by the at least one first terminal to the at least one second terminal. Therefore, the first packet is recovered according to the local recovery mechanism by using the received redundant packet and the received service packet.

In a possible implementation of the first aspect, the first node adds the first identification information to the first packet, when the network status information monitored by the first node indicates network congestion, or when the depth of the forwarding queue on the first node exceeds the preset depth threshold. When the status of the network is congested, the first identification information is added to the first packet, so that the first terminal can accurately determine the current network status based on the first identification information.

In a possible implementation of the first aspect, a target field in a packet header of the first packet includes the first identification information.

In a possible implementation of the first aspect, the packet header of the first packet includes an outer packet header and an inner packet header. The target field is an explicit congestion notification ECN field, an option field, or a reserved field in the outer packet header.

According to a second aspect, this application provides a communications method, where the method includes: receiving, by a third node, a first packet sent by a first node, where the first packet includes first identification information related to local recovery, the first packet is a packet obtained based on a packet sent by at least one first terminal to at least one second terminal, the first node and the third node are nodes on a network path between each first terminal and a second terminal communicating with the first terminal, and the local recovery is packet recovery implemented by the first node; and sending, the first packet to the at least one second terminal. Because the first packet is the packet recovered by the first node, the first node does not need to wait for the first terminal to resend the first packet to the second terminal, and this reduces a transmission delay and improves transmission efficiency. In addition, the first packet includes the first identification information, and the first identification information may be transmitted to the first terminal. The first terminal accurately determines a current status of a network based on the first identification information, and sends a packet based on the accurately determined network status. This further improves transmission efficiency. Moreover, because the first packet includes the first identification information related to the local recovery, the first terminal may be notified, through the first identification information, that the first packet is recovered by the first node by performing the local recovery.

In a possible implementation of the second aspect, the first identification information is used to identify that the first packet is a packet recovered according to a local recovery mechanism, the first identification information is used to identify a quantity of times for which the first packet is recovered, or the first identification information is used to identify that a current network status is network congestion. In this case, the first terminal may be notified, through the first identification information, that the first packet is recovered by the first node by performing the local recovery.

In a possible implementation of the second aspect, the third node is an edge node connected to at least one second terminal, a packet header of the first packet includes an outer packet header and an inner packet header. A target field in the outer packet header includes the first identification information. The third node removes the outer packet header of the first packet, and sets the target field in the inner packet header of the first packet to include the first identification information. This ensures that the first identification information can be transmitted to the second terminal.

In a possible implementation of the second aspect, the target field is an explicit congestion notification ECN field, an option field, or a reserved field.

According to a third aspect, this application provides a communications method, where the method includes: sending, by a first terminal, at least one service packet to a second terminal; and receiving, a first feedback packet that is sent by the second terminal when the second terminal receives a first packet, where the first packet includes first identification information related to local recovery, the first feedback packet includes at least one of second identification information or the first identification information, the local recovery is packet recovery implemented by a node on a network path between the first terminal and the second terminal, the first packet is a packet obtained by recovering a lost packet in the at least one service packet, and the second identification information is identification information obtained based on the first identification information. The first packet is a lost packet. Because the first packet is the packet recovered by the node on the network path, there is no need to wait for the first terminal to resend the first packet to the second terminal, and this reduces a transmission delay and improves transmission efficiency. In addition, the first packet includes the first identification information, and the first identification information may be transmitted to the first terminal. The first terminal accurately determines a current status of the network based on the first identification information, and sends a packet based on the accurately determined network status. This further improves transmission efficiency. Moreover, because the first feedback packet includes at least one of the second identification information and the first identification information that is related to the local recovery, based on the first identification information and the second identification information, it may be learned that the first packet is recovered by performing the local recovery by the node on the network path.

In a possible implementation of the third aspect, the first identification information is used to identify that the first packet is a packet recovered according to a local recovery mechanism, the first identification information is used to identify a quantity of times for which the first packet is recovered, or the first identification information is used to identify that a current network status is network congestion. In this case, the first terminal may be notified, through the first identification information, that the first packet is recovered by the first node by performing the local recovery.

In a possible implementation of the third aspect, the first terminal determines, based on the first identification information, to skip using the first feedback packet to calculate a round trip time (RTT) of the first packet. Because the RTT of the first packet calculated based on the first feedback packet is inaccurate, this method may avoid the inaccurately calculated RTT.

In a possible implementation of the third aspect, the first terminal receives a second feedback packet sent by the second terminal when the second terminal receives a second packet, where the second feedback packet is used to indicate that the second packet is a falsely retransmitted packet, the second packet is a packet sent by the first terminal when the first terminal detects that a packet in the at least one service packet is lost; and the second packet is a lost packet in the at least one service packet.

The first terminal determines, based on the first identification information and the second feedback packet, that a reason why a service packet sending rate continues to decrease and/or that a reason of the falsely retransmitted packet is due to the recovery, according to the local recovery mechanism, performed on a packet lost on a network. In this case, the first identification information and/or the second identification information is used to avoid an incorrect operation performed by the first terminal when the first terminal inaccurately determines the current network status.

In a possible implementation of the third aspect, a target field in a packet header of the first feedback packet includes at least one of the first identification information or the second identification information.

In a possible implementation of the first aspect, the first feedback packet is an acknowledgment (ACK) packet, and in a TCP packet header of the first feedback packet, an explicit congestion experience (ECE) field, an option field, or a reserved field includes the first identification information;

the first feedback packet is an explicit congestion notification echo (ECN Echo) packet, and a congestion experience marked packet (Number CE Marked Packets) field, in the ECN Echo packet, includes the second identification information; or the first feedback packet is a real-time transport protocol/audio-visual profile with feedback (RTP/AVPF) transport layer explicit congestion notification feedback packet, and an explicit congestion experience count field of the RTP/AVPF transport layer explicit congestion notification feedback packet includes the second identification information.

According to a fourth aspect, this application provides a communications method, where the method includes: receiving, by a second terminal, a first packet sent by a first node, where the first packet includes first identification information related to local recovery, the first node is a node that is in at least one first terminal and on a network path between each first terminal and the second terminal, and the local recovery is packet recovery implemented by the first node; and sending a first feedback packet to the at least one first terminal, where the first feedback packet includes at least one of second identification information or the first identification information, and the second identification information is identification information obtained based on the first identification information. The first packet is a lost packet and is obtained by the first node through the local recovery. There is no need to wait for the first terminal to resend the first packet to the second terminal, and this reduces a transmission delay. In addition, because the first packet includes the first identification information related to the local recovery, the first terminal may be notified, through the first identification information, that the first packet is a packet recovered by the first node by performing the local recovery.

In a possible implementation of the fourth aspect, the first identification information is used to identify that the first packet is a packet recovered according to a local recovery mechanism, the first identification information is used to identify a quantity of times for which the first packet is recovered, or the first identification information is used to identify that a current network status indicates network congestion. In this case, the first terminal may be notified, through the first identification information, that the first packet is recovered by the first node by performing the local recovery.

In a possible implementation of the fourth aspect, an Internet protocol address IP packet header of the first packet includes the first identification information.

In a possible implementation of the fourth aspect, a target field in a packet header of the first feedback packet includes at least one of the first identification information or the second identification information.

In a possible implementation of the fourth aspect, the first feedback packet is an acknowledgment (ACK) packet, and in a TCP packet header of the first feedback packet, an explicit congestion experience ECE field, an option field, or a reserved field includes the first identification information;

the first feedback packet is an explicit congestion notification echo (ECN Echo) packet, and a congestion experience marked packet (Number CE Marked Packets) field, in the ECN Echo packet, includes the second identification information; or the first feedback packet is a real-time transport protocol/audio-visual profile with feedback (RTP/AVPF) transport layer explicit congestion notification feedback packet, and an explicit congestion experience count field of the RTP/AVPF transport layer explicit congestion notification feedback packet includes the second identification information.

According to a fourth aspect, this application provides a communications apparatus, configured to perform the method in any one of the first aspect or the optional implementations of the first aspect. Specifically, the apparatus includes units configured to perform the method in the first aspect or any optional implementations of the first aspect.

According to a fifth aspect, this application provides a communications apparatus, configured to perform the method in any one of the second aspect or the optional implementations of the second aspect. Specifically, the apparatus includes units configured to perform the method in the second aspect or any optional implementations of the second aspect.

According to a sixth aspect, this application provides a communications apparatus, configured to perform the method in any one of the third aspect or the optional implementations of the third aspect. Specifically, the apparatus includes units configured to perform the method in the third aspect or any optional implementations of the third aspect.

According to a seventh aspect, this application provides a communications apparatus, configured to perform the method in any one of the fourth aspect or the optional implementations of the fourth aspect. Specifically, the apparatus includes units configured to perform the method in the fourth aspect or any optional implementations of the fourth aspect.

According to an eighth aspect, an embodiment of this application provides an apparatus, where the apparatus includes at least one processor, at least one memory, and at least one transceiver. The at least one processor is connected to the at least one memory and the at least one transceiver via a bus. The at least one memory stores one or more programs, the one or more programs are configured to be executed by the at least one processor, and the one or more programs include an instruction used to perform the method according to any one of the first aspect or the optional implementations of the first aspect.

According to a ninth aspect, an embodiment of this application provides an apparatus, where the apparatus includes at least one processor, at least one memory, and at least one transceiver. The at least one processor is connected to the at least one memory and the at least one transceiver via a bus. The at least one memory stores one or more programs, the one or more programs are configured to be executed by the at least one processor, and the one or more programs include an instruction used to perform the method according to any one of the second aspect or the optional implementations of the second aspect.

According to a tenth aspect, an embodiment of this application provides an apparatus, where the apparatus includes at least one processor, at least one memory, and at least one transceiver. The at least one processor is connected to the at least one memory and the at least one transceiver via a bus. The at least one memory stores one or more programs, the one or more programs are configured to be executed by the at least one processor, and the one or more programs include an instruction used to perform the method according to any one of the third aspect or the optional implementations of the third aspect.

According to an eleventh aspect, an embodiment of this application provides an apparatus, where the apparatus includes at least one processor, at least one memory, and at least one transceiver. The at least one processor is connected to the at least one memory and the at least one transceiver via a bus. The at least one memory stores one or more programs, the one or more programs are configured to be executed by the at least one processor, and the one or more programs include an instruction used to perform the method according to any one of the fourth aspect or the optional implementations of the fourth aspect.

According to a twelfth aspect, this application provides a computer readable storage medium, where the computer readable storage medium stores an instruction. When the instruction is run on a computer, the computer is enabled to perform any one of the first aspect, the second aspect, the third aspect, the fourth aspect, the optional implementations of the first aspect, the optional implementations of the second aspect, the optional implementations of the third aspect, or the optional implementations of the fourth aspect.

According to a thirteenth aspect, this application provides a computer program product including an instruction. When the instruction is run on a computer, the computer is enabled to perform any one of the first aspect, the second aspect, the third aspect, the fourth aspect, the optional implementations of the first aspect, the optional implementations of the second aspect, the optional implementations of the third aspect, or the optional implementations of the fourth aspect.

According to a twelfth aspect, this application provides a communications system, where the system includes the apparatuses according to the fifth aspect, the sixth aspect, the seventh aspect, and the eighth aspect, or the system includes the apparatuses according to the seventh aspect, the tenth aspect, the eleventh aspect, and the twelfth aspect.

DESCRIPTION OF EMBODIMENTS

The following further describes the embodiments of this application in detail with reference to the accompanying drawings.

Figure 1:
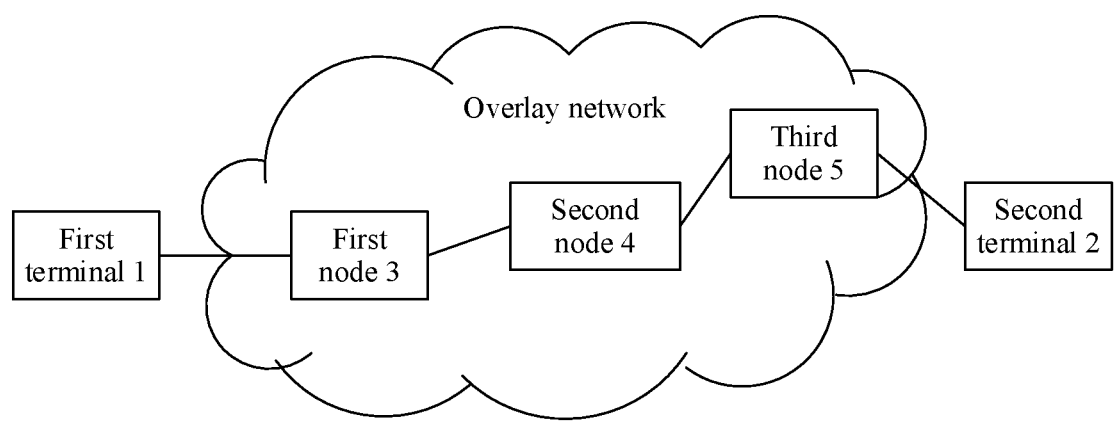
FIG. 1 is a schematic diagram of a network architecture according to this application.

In referring to FIG. 1, an embodiment of this application provides a network architecture. The network architecture includes a plurality of terminals, where the plurality of terminals are connected to a virtual overlay network. The overlay network is a virtual network overlaid on a physical network, and the overlay network includes a plurality of nodes.

For example, in FIG. 1, the plurality of terminals includes a first terminal 1, a second terminal 2, and the like. The plurality of nodes includes a first node 3, a second node 4, a third node 5, and the like. The first terminal 1 and the second terminal 2 are connected to the overlay network including devices such as the first node 3, the second node 4, and the third node 5.

A network path may be established between the first terminal 1 and the second terminal 2, and the network path passes through at least one node on the overlay network.

Optionally, the network path may be a transmission control protocol (TCP) connection, a user datagram protocol (UDP) path, or the like.

The first terminal 1 may send at least one service packet to the second terminal 2 through the network path. The first terminal 1 sends the service packet to the second terminal 2 as follows:

Optionally, the first terminal 1 is configured to send at least one service packet to the second terminal 2, and detect, according to a packet acknowledgment mechanism, whether a packet is lost in a process of sending the at least one service packet to the second terminal 2. If detecting that a packet is lost, the first terminal 1 reduces a service packet sending rate, and sends a second packet to the second terminal 2, where the second packet is the lost packet.

The at least one service packet sent by the first terminal 1 is transmitted to the second terminal 2 through the overlay network. During a transmission through the overlay network, a packet in the at least one service packet may be lost. For a service packet that is not lost, the service packet continues to be transmitted to the second terminal 2 through the overlay network. For the lost packet, a node on the overlay network may recover the lost packet according to a local recovery mechanism to obtain a first packet, and send the first packet to the second terminal 2, where the first packet includes first identification information related to local recovery. The second terminal 2 receives the first packet, and sends a first feedback packet to the first terminal 1, where the first feedback packet includes at least one of the first identification information or second identification information, and the second identification information is identification information obtained based on the first identification information. The local recovery refers to packet recovery implemented by the node on the overlay network.

The second packet sent by the first terminal 1 may be transmitted to the second terminal 2 through the overlay network. The second terminal 2 receives the second packet, finds that the first packet and the second packet are the same, and sends a second feedback packet to the first terminal 1. The second feedback packet is used to indicate that the second packet is a falsely retransmitted packet.

The first terminal 1 receives the first feedback packet, and determines, based on the first identification information and/or the second identification information included in the first feedback packet, to skip using the first feedback packet to calculate a round-trip time (RTT) of the first packet, and/or adjust the service packet sending rate based on the second identification information. The first terminal 1 receives the second feedback packet, and determines, based on the first identification information and the second feedback packet, that a reason why a service packet sending rate continues to decrease and/or that a reason of the falsely retransmitted packet is due to the recovery, according to the local recovery mechanism, performed on a packet lost on a network.

Optionally, there may be one or more first terminals 1, and there may be one or more second terminals 2. In other words, at least one first terminal 1 sends a service packet to at least one second terminal 2.

For a node on the overlay network on a network path between each of the at least one first terminal 1 and the second terminal 2 communicating with the first terminal 1, the node may receive the service packet from the at least one first terminal 1, and forward the service packet to the at least one second terminal 2. The node on the overlay network receives and forwards the service packet as follows:

The node is configured to receive a service packet, where the service packet is a packet obtained based on a packet sent by the at least one first terminal 1, send the received service packet to the second terminal 2, and detect whether a packet in the packet sent by the at least one first terminal 1 to the at least one second terminal 2 is lost. If the packet is lost, the node recovers the lost packet according to the local recovery mechanism to obtain a first packet, and sends the first packet to the second terminal 2, where the first packet includes first identification information related to the local recovery.

For a detailed process in which the node detects that the packet is lost and recovers the first packet, refer to related content in any one of the following embodiments. Details are not described herein.

Figure 2:
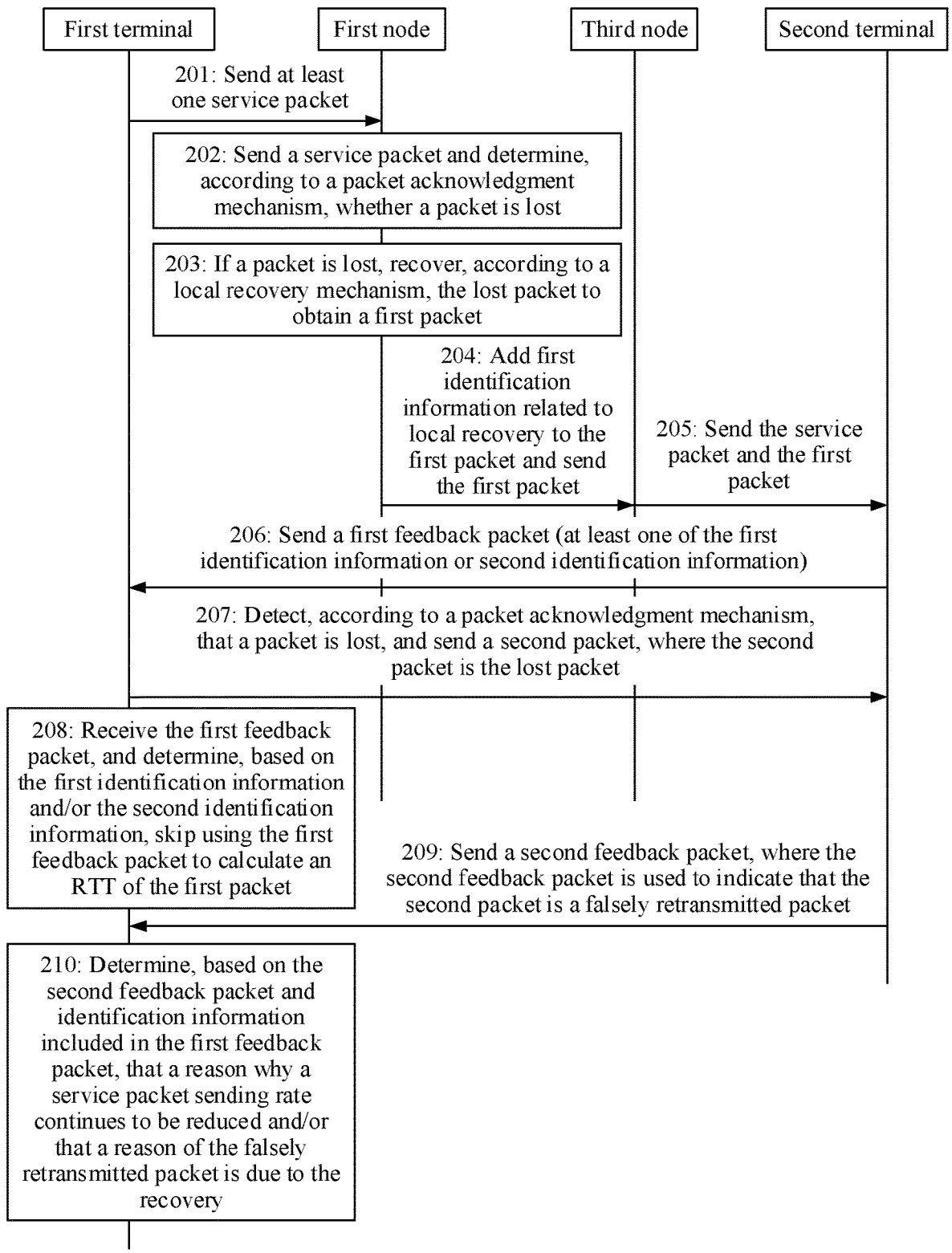
FIG. 2 is a flowchart of a communications method according to this application.

In referring to FIG. 2, an embodiment of this application provides a communications method. The communications method may be applied to the network architecture shown in FIG. 1, and includes the following steps.

S201: A first terminal sends at least one service packet to a second terminal.

There may be one or more first terminals, and there may be one or more second terminals. In other words, at least one first terminal sends the service packet to at least one second terminal.

For each first terminal, the first terminal sends at least one service packet to one second terminal, where the sequence numbers of the at least one service packet may be consecutive.

The first terminal and the second terminal are connected to an overlay network. The at least one service packet sent by the first terminal to the second terminal is received by a node on the overlay network. Then, the node forwards the service packet to the second terminal. Detailed implementation is as follows:

S202: A first node receives the service packet, sends the service packet to a second node, and detects, according to a packet acknowledgment mechanism, whether a packet is lost in a process of transmitting the service packet to the second node.

The first node and the second node are two different nodes on the overlay network on a network path between each of the at least one first terminal and the second terminal communicating with the first terminal. The second node may be a next-hop node of the first node.

A previous hop of the first node may be the at least one first terminal. In other words, the first node may be an edge node connected to the at least one first terminal. Alternatively, the previous hop of the first node may be a node on the network path on the overlay network.

When the previous hop of the first node is the at least one first terminal, the first node receives a service packet directly sent by the at least one first terminal. Alternatively, when the previous hop of the first node may be a node on the network path on the overlay network, the first node receives a service packet forwarded by the node.

After receiving the service packet, the first node may further buffer the received service packet. A time length for buffering the service packet may be a preset time length. In other words, when the time length for buffering the received service packet by the first node reaches the preset time length, the first node deletes a buffered service packet.

The service packet received by the first node may be a packet obtained based on a packet sent by the at least one first terminal to the at least one second terminal. Optionally, the service packet received by the first node may be a packet obtained by the edge node connected to the at least one first terminal based on a packet sent by the at least one first terminal to the at least one second terminal.

In a case in which a network tunnel is established between nodes on the network path on the overlay network, when receiving service packets sent by the at least one first terminal, the edge node connected to the at least one first terminal may combine the received service packets. To be specific, the edge node combines a plurality of service packets into one service packet. Packet headers of the plurality of service packets are used as an inner packet header of the combined service packet. The edge node numbers the combined service packet and adds an outer packet header to the combined service packet. The outer packet header includes a sequence number of the numbered service packet. Sequence numbers of combined service packets are assigned consecutively. Then, the edge node sends the combined service packet to a next-hop node.

Alternatively, when receiving a service packet sent by the at least one first terminal, the edge node may split the received service packet. To be specific, the edge node splits one service packet into a plurality of service packets. A packet header of the one service packet is used as inner packet headers of the split service packets. The edge node numbers the split service packets and adds outer packet headers to the split service packets, where the outer packet headers include sequence numbers of the numbered service packet, and the sequence numbers of the split service packets are consecutive. Then, the edge node sends the split service packets to a next-hop node.

Alternatively, when receiving a service packet sent by the at least one first terminal, the edge node may number the received service packet and add an outer packet header to the received service packet, where the outer packet header includes a sequence number of the numbered service packet. An original packet header of the received packet is used as an inner packet header. Sequence numbers of numbered service packets are assigned consecutively. Then, the edge node sends the service packet to which the outer packet header is added to a next-hop node.

In a case in which no network tunnel is established between the nodes on the network path on the overlay network, the edge node receives a service packet sent by the at least one first terminal, and assigns the received service packet a sequence number. A packet header of the service packet includes the sequence number. Sequence numbers of service packets are assigned consecutively. Then, the edge node sends the received service packet to a next-hop node.

Optionally, the packet acknowledgment mechanism includes the following two implementations:

First manner: The first node sends service packets to the second node. Sequence numbers of the service packets sent by the first node are consecutive. The second node receives the service packets, and detects, based on the sequence numbers of the received service packets, whether a packet is lost. If the second node detects that a packet is lost, the second node further detects a sequence number of the lost packet. For ease of description, the lost packet is referred to as the first packet. The second node sends the sequence number of the first packet to the first node, and continues to send the received service packet to the second terminal. The first node receives the sequence number of the first packet, and detects, according to the packet acknowledgment mechanism, that the first packet is lost. Alternatively, the second node sends the sequence number of the first packet to the first node, and continues to send the received service packet to the second terminal. The first node receives the sequence number of the service packet, determines, based on the sequence number of the service packet, the sequence number of the lost first packet. Then, the first node detects, according to the packet acknowledgment mechanism, that the first packet is lost.

Optionally, the second node sends a negative acknowledgment (NACK) packet or an ACK packet to the first node, where the NACK packet carries the sequence number of the first packet or the sequence number of the received service packet. Alternatively, the ACK packet carries the sequence number of the first packet or the sequence number of the received service packet.

Optionally, the second node may or may not be an edge node connected to the second terminal. When the second node is the edge node connected to the second terminal, the second node directly sends the service packet to the second terminal. When the second node is not the edge node connected to the second terminal, the second node sends the service packet to a next-hop node.

Second manner: The first node sends the service packet to the second node, and starts a timer corresponding to each service packet that is sent. The second node receives the service packet, sends an acknowledgment message corresponding to the service packet to the first node, and sends the service packet to the second terminal. If the first node does not receive the acknowledgment message corresponding to the service packet when a time counted by the timer of the service packet reaches a preset time threshold, the first node detects that the service packet is lost. In this case, the first node detects, according to the packet acknowledgment mechanism, that a packet is lost. For ease of description, the lost packet is referred to as the first packet.

S203: If the first node detects that a packet is lost, the first node recovers the lost packet according to a local recovery mechanism, to obtain the first packet.

Because the first node buffers the received service packet and may detect the sequence number of the lost first packet, the local recovery mechanism refers to that the first node obtains the first packet from the buffered service packet based on the sequence number of the first packet.

Optionally, the service packet received by the first node may be buffered in a local memory of the first node, or may be buffered in another node that is relatively close to the first node. The other node may be a storage node. For example, the service packet received by the first node may be buffered in a storage node closest to the first node.

S204: The first node adds first identification information related to local recovery to the first packet and sends the first packet.

The local recovery refers to packet recovery implemented by the first node.

Optionally, the first identification information is used to identify that the first packet is a packet recovered according to the local recovery mechanism, the first identification information is used to identify a quantity of times for which the first packet is recovered, or the first identification information is used to identify that a current network status indicates network congestion.

Optionally, in the case in which the first identification information is used to identify that the first packet is a packet recovered according to the local recovery mechanism, the first identification information is used to identify that the first packet is a packet recovered according to the local recovery mechanism by a node on the network path on the overlay network. Alternatively, the first identification information is used to identify that the first packet is a packet recovered by the first node according to the local recovery mechanism.

Optionally, the first identification information is used to identify a status of a network between the first node and a neighboring node of the first node, or is used to identify a status of a network between the first node and a node connected to the first node.

Optionally, in the case in which the first identification information is used to identify a quantity of times for which the first packet is recovered, the first identification information may be the quantity of times for which the first packet is recovered, or the first identification information is used to identify that the quantity of times for which the first packet is recovered is greater than or equal to a preset quantity threshold.

In this step, when recovering the first packet, the first node adds the first identification information to the first packet. Alternatively, the first node adds the first identification information to the first packet when the quantity of times for which the first packet is recovered reaches the preset quantity threshold, when network status information monitored by the first node indicates network congestion, or when a depth of a forwarding queue on the first node exceeds a preset depth threshold.

The forwarding queue is used to store a packet that is received by the first node and that is not sent. The depth of the forwarding queue refers to a quantity of packets stored in the forwarding queue. When the depth of the forwarding queue exceeds a preset depth threshold, it indicates that the forwarding queue stores a large quantity of packets that are not sent in time and a current network status indicates network congestion.

Optionally, a target field in a packet header of the first packet includes the first identification information.

Optionally, when a network tunnel is established between the first node and the second node, the first packet includes an outer packet header and an inner packet header, and the target field may be a field in the outer packet header of the first packet. Optionally, the target field may be a field in an outer internet protocol address (IP) packet header of the first packet.

Optionally, the target field may be an explicit congestion notification (ECN) field, an option field, a reserved field, or the like in the packet header of the first packet.

In the case in which the packet header of the first packet includes an outer packet header and an inner packet header, the first identification information may be added to the target field in the outer packet header of the first packet in the following two manners. The two manners are described as follows:

In a first manner, the ECN field or the reserved field in the outer packet header of the first packet is set to include the first identification information.

Figure 3A:
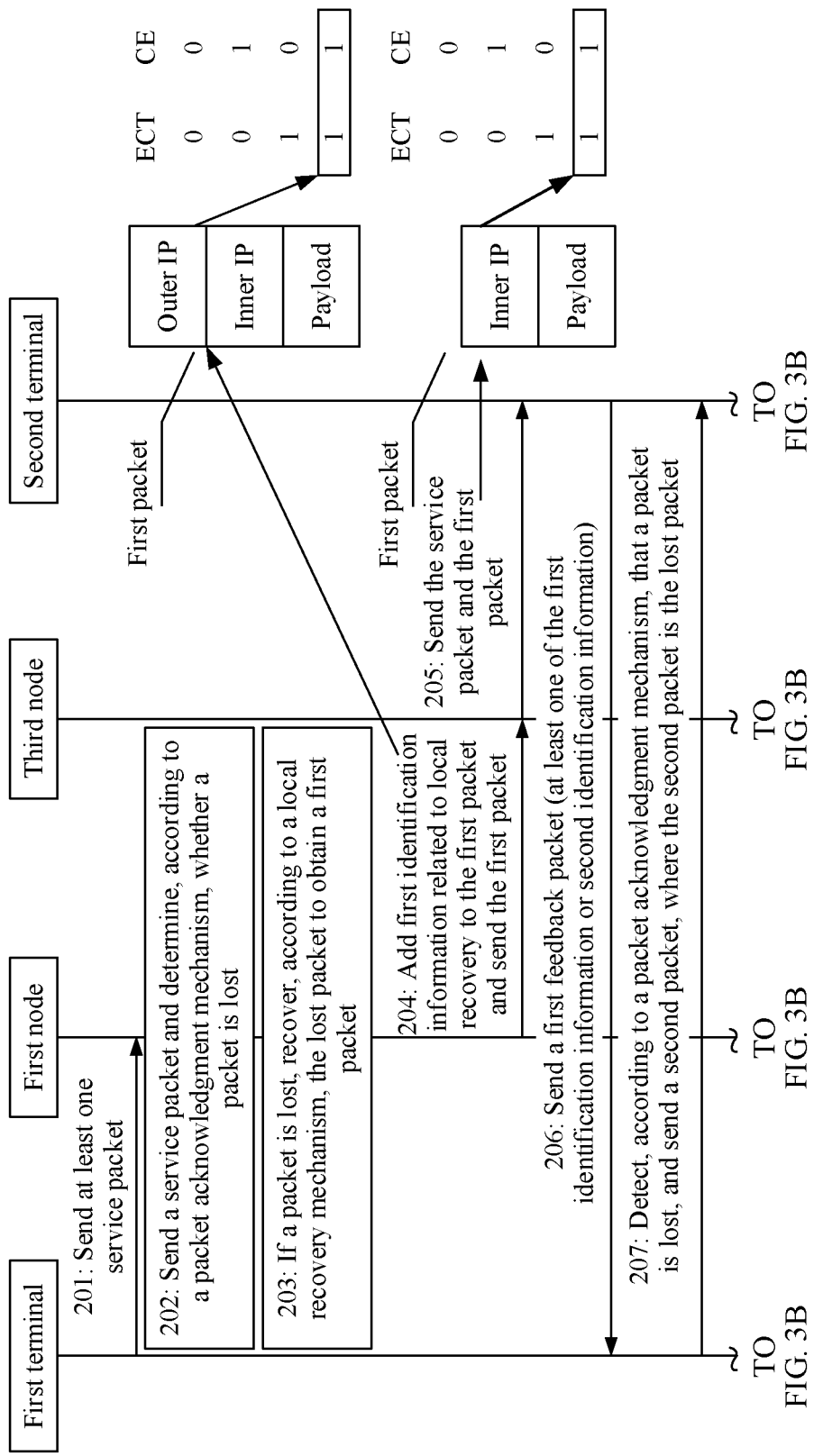
FIG. 3A and FIG. 3B are a schematic diagram of adding first identification information to a first packet according to this application.
Figure 3B:
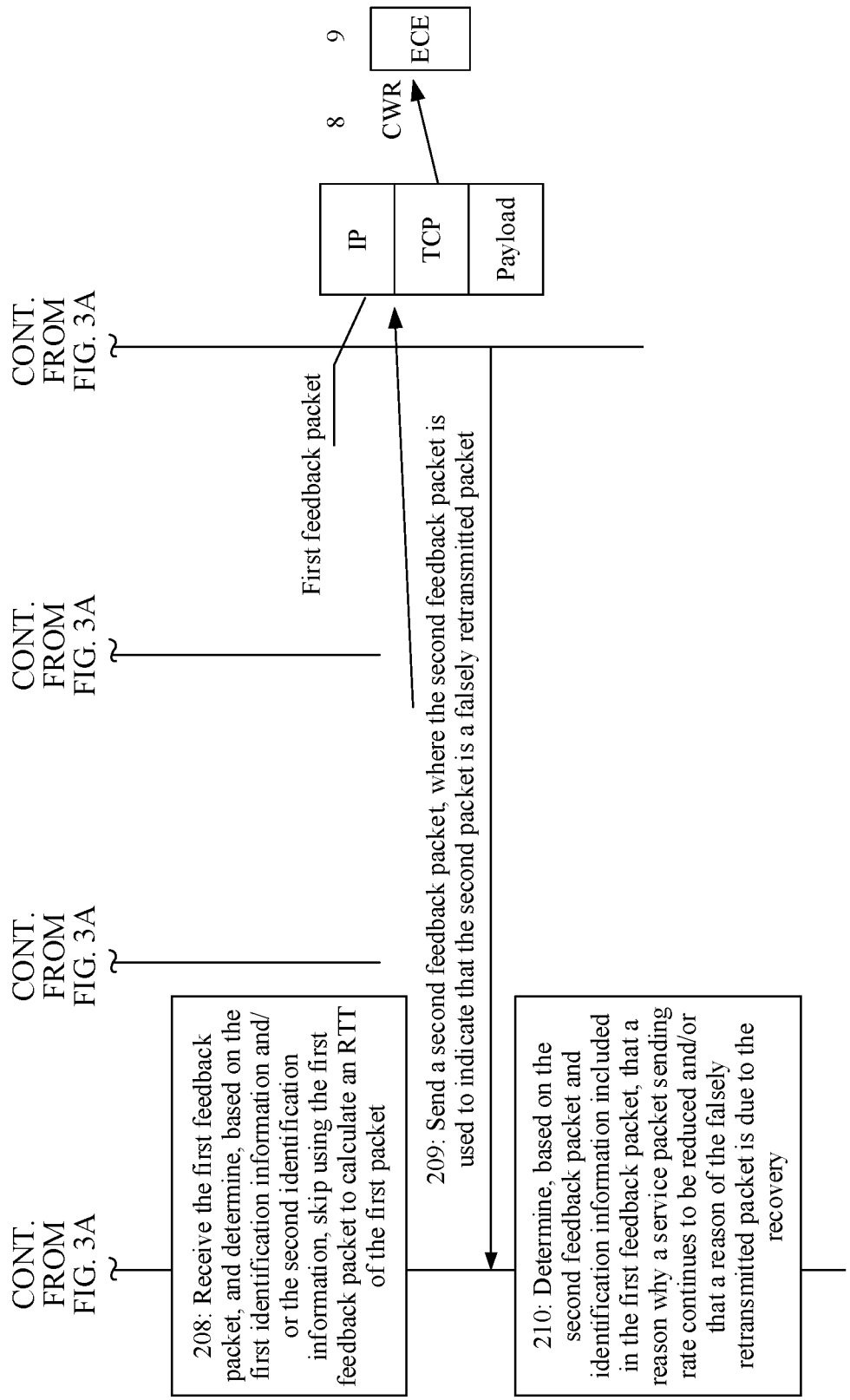

Refer to FIG. 3A and FIG. 3B. An ECN field in an outer packet header of a first packet includes two bits, where the two bits are respectively ECN-capable transport (ECT) and congestion experience (CE). A value of the ECT is set to a first preset bit value and a value of the CE is set to a second preset bit value. In other words, the first preset bit value and the second preset bit value are used to represent the first identification information.

For example, in the example in FIG. 3A, both the first preset bit value and the second preset bit value are 1, that is, a bit 11 is used to represent the first identification information. The first preset bit value and the second preset bit value shown in FIG. 3A are merely examples. The first preset bit value and the second preset bit value may alternatively be other values. Details are not described herein.

Figure 4A:
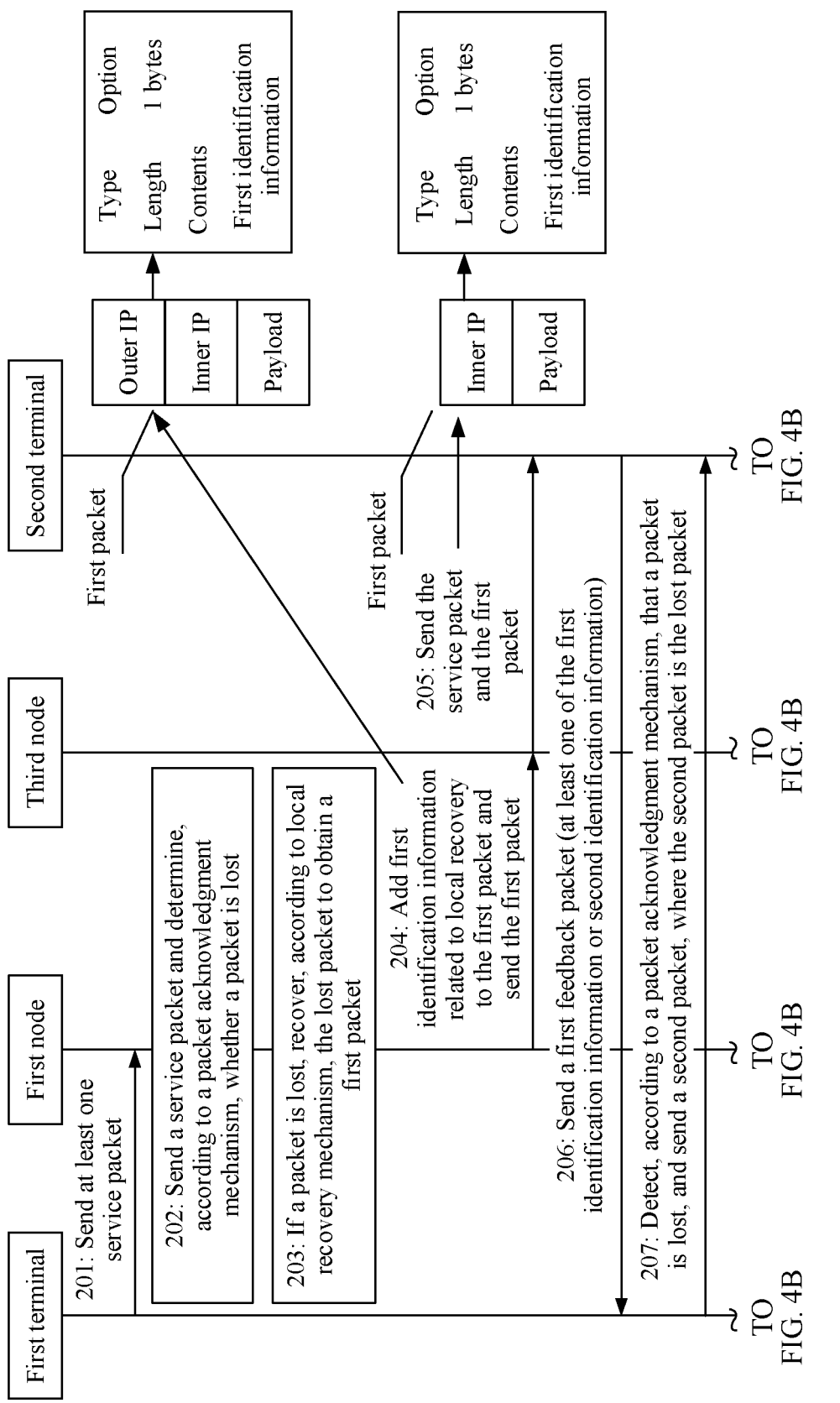
FIG. 4A and FIG. 4B are a schematic diagram of moving first identification information according to this application.
Figure 4B:
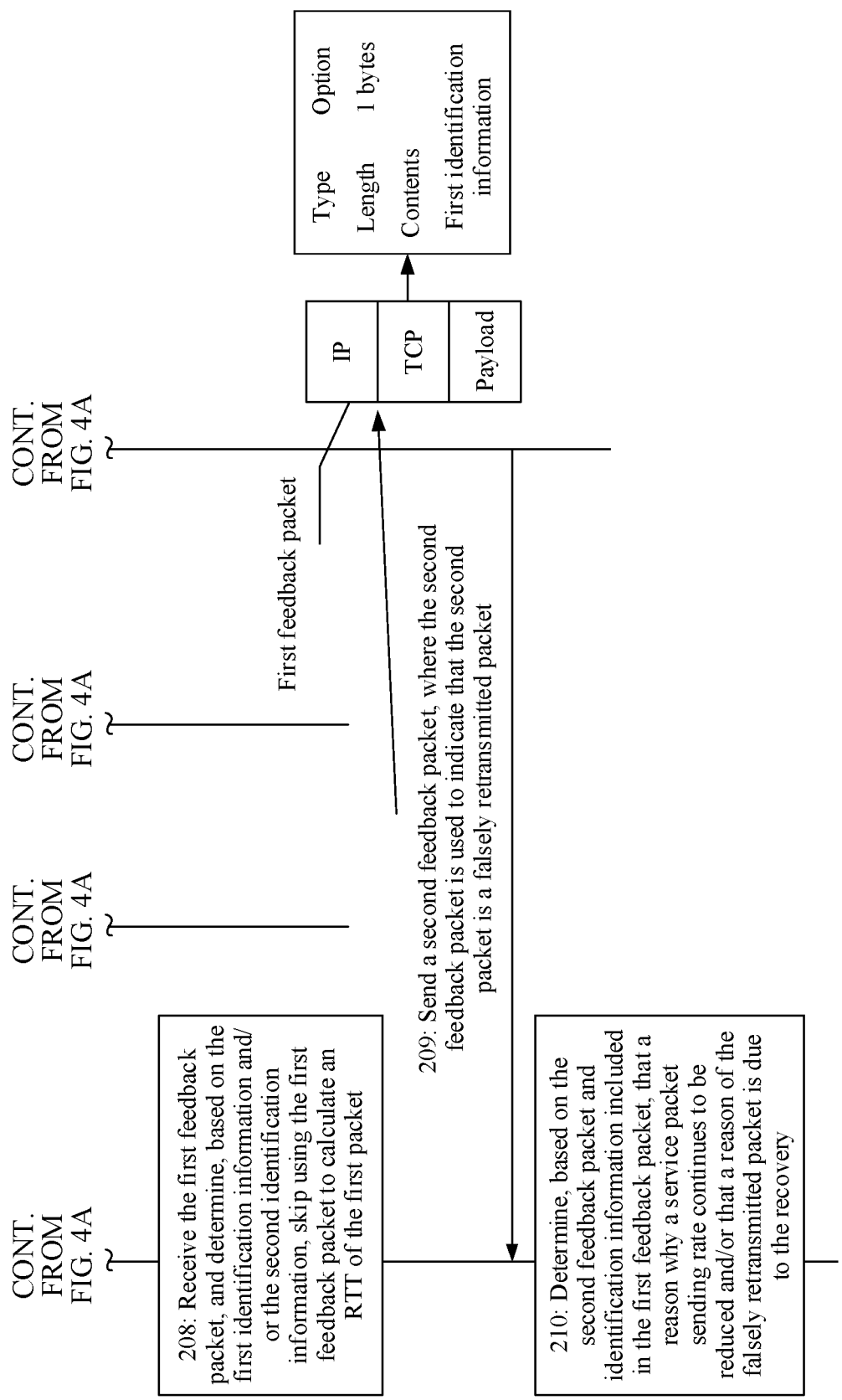

In a second manner, referring to FIG. 4A and FIG. 4B, the option field is added to the outer packet header of the first packet, and is set to include the first identification information.

Optionally, a length of the option field may be a preset length. For example, the length of the option field may be a length of 1 byte or 2 bytes.

Optionally, when no network tunnel is established between the first node and the second node, the target field may be a target field in the packet header of the first packet. Optionally, the target field may be a field in the IP packet header of the first packet. The first identification information may be added to the target field in the packet header of the first packet in the following two manners. The two manners are described as follows:

In a first manner, the ECN field or the reserved field in the packet header of the first packet is set to include the first identification information.

Figure 5A:
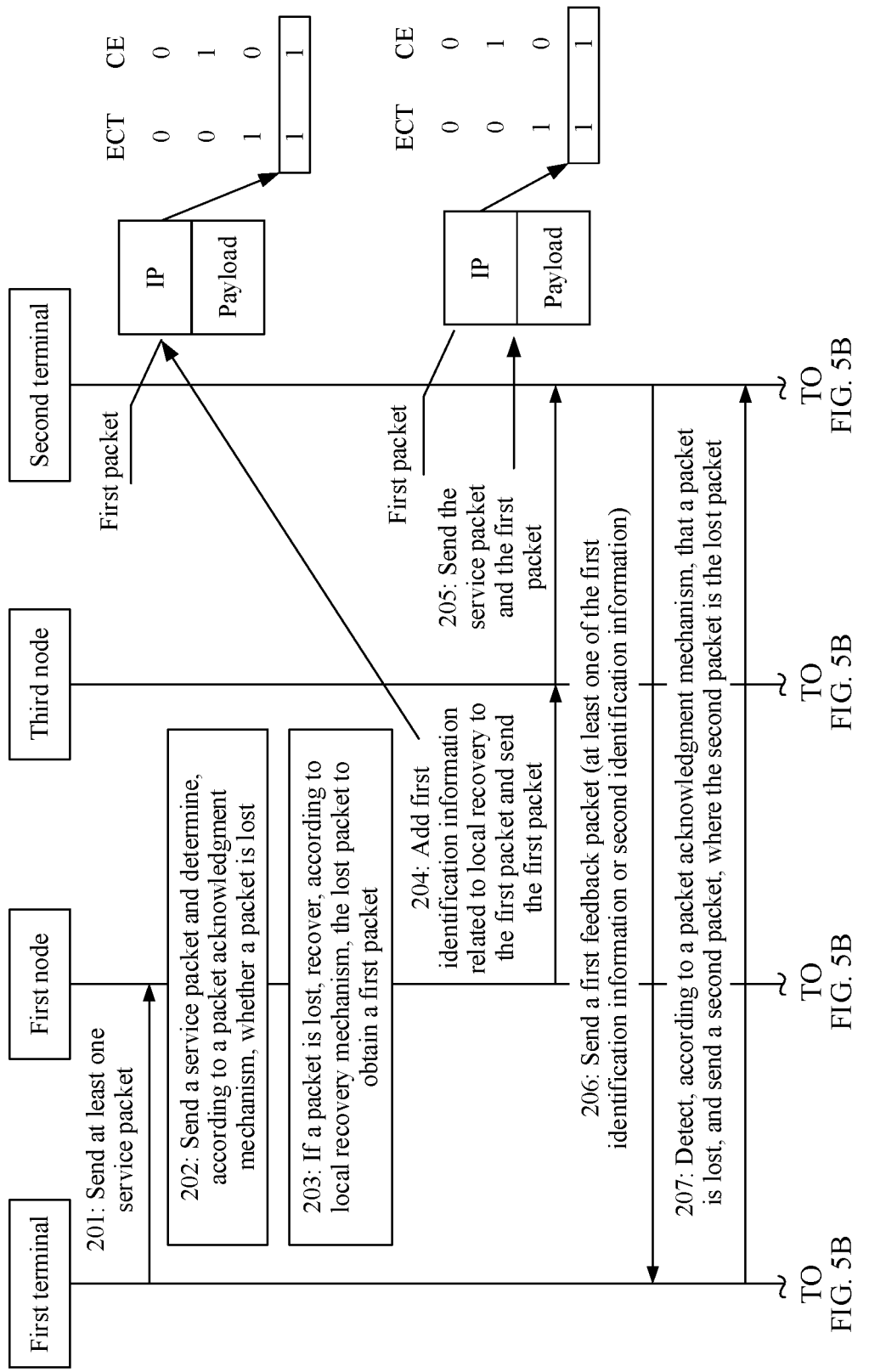
FIG. 5A and FIG. 5B are another schematic diagram of adding first identification information to a first packet according to this application.
Figure 5B:
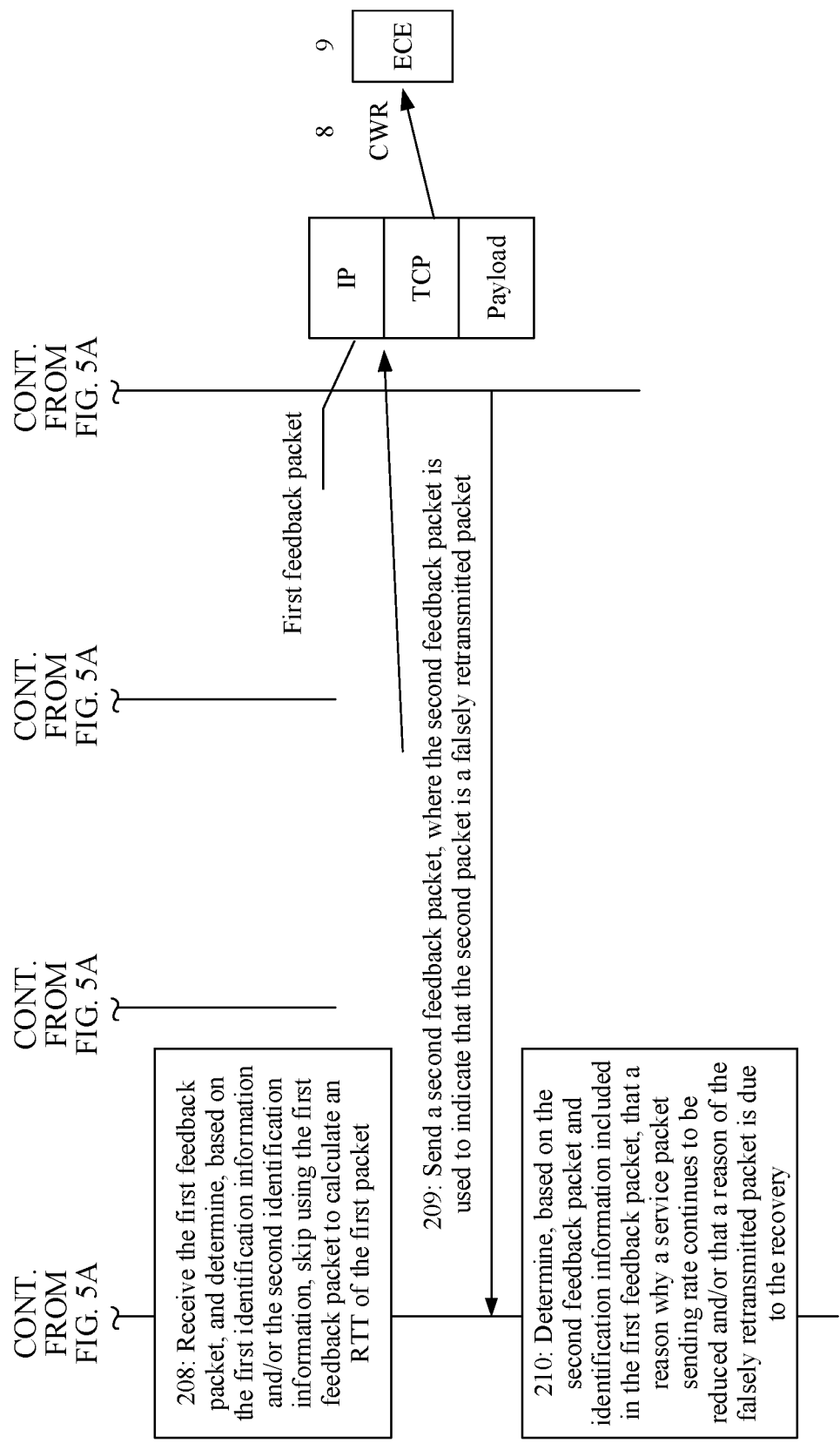

Refer to FIG. 5A and FIG. 5B. The ECN field in the outer packet header of the first packet includes two bits, where the two bits are respectively ECT and CE. A value of the ECT is set to a first preset bit value and a value of the CE is set to a second preset bit value. In other words, the first preset bit value and the second preset bit value may be used to represent the first identification information.

For example, in the example in FIG. 5A, both the first preset bit value and the second preset bit value are 1, that is, a bit 11 is used to represent the first identification information. The first preset bit value and the second preset bit value shown in FIG. 5A are merely examples. The first preset bit value and the second preset bit value may alternatively be other values. Details are not described herein.

Figure 6A:
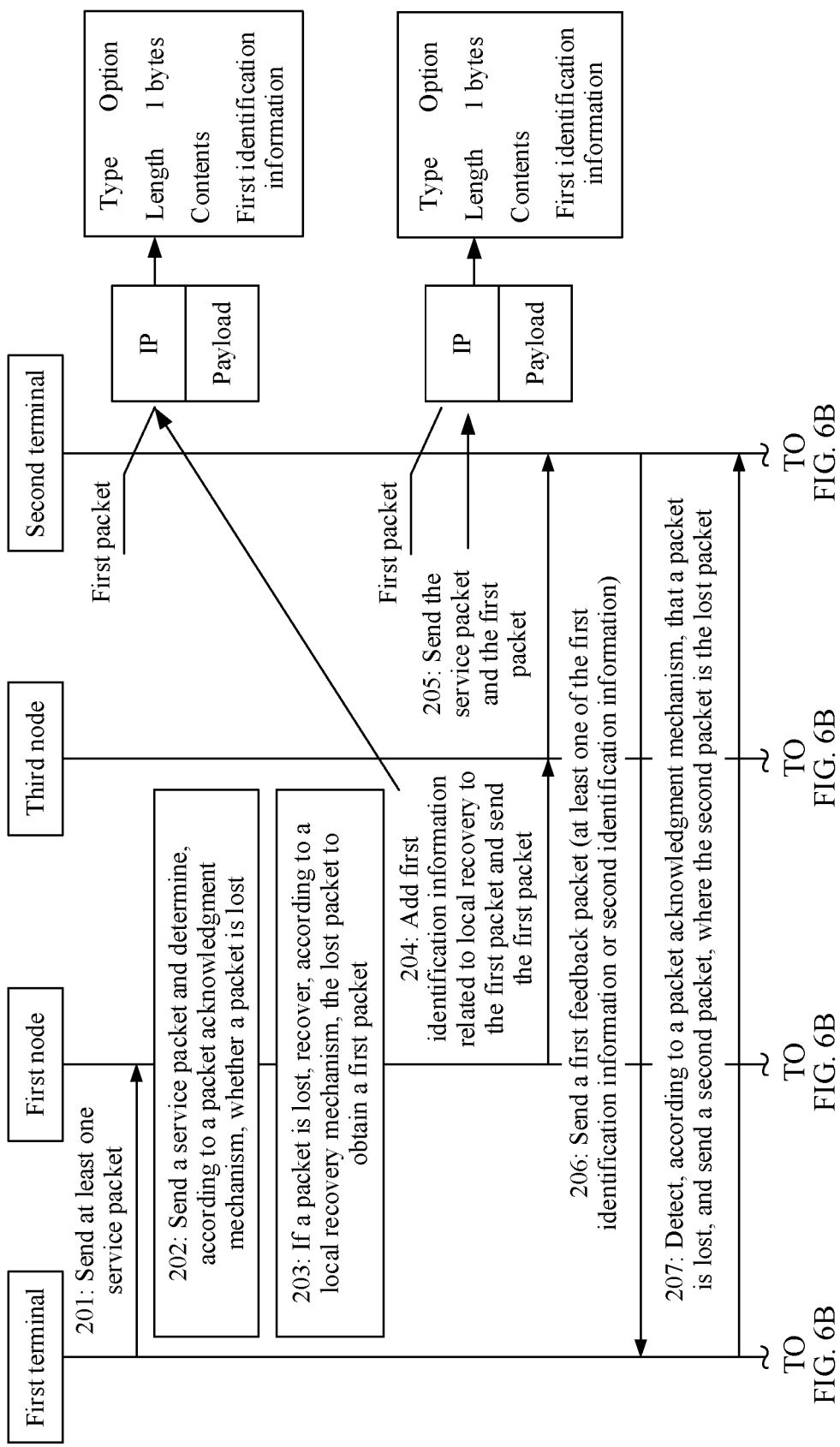
FIG. 6A and FIG. 6B are another schematic diagram of moving first identification information according to this application.
Figure 6B:
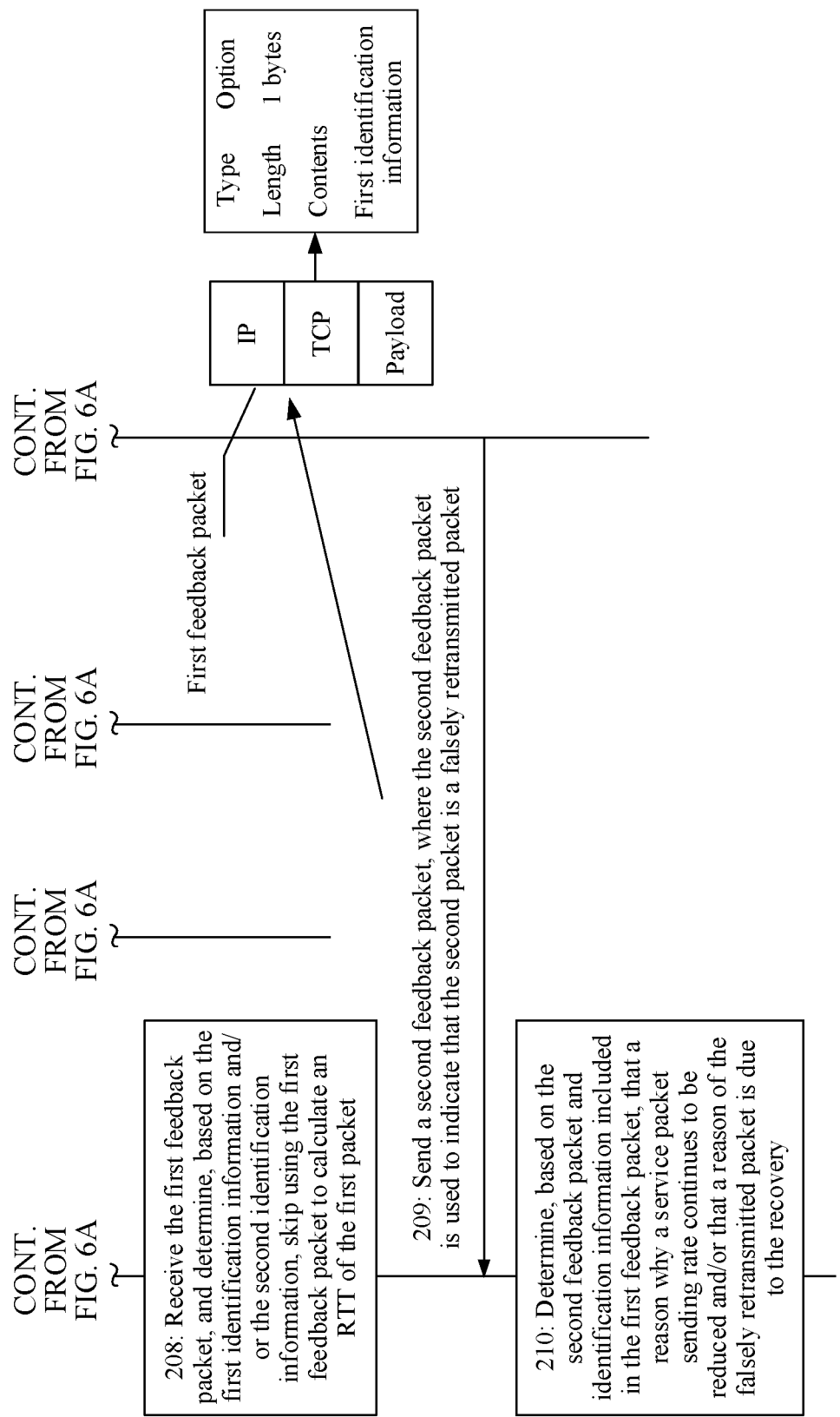

In a second manner, referring to FIG. 6A and FIG. 6B, the option field is added to the packet header of the first packet, and the option field is set to include the first identification information.

Optionally, a length of the option field may be a preset length. For example, the length of the option field may be a length of 1 byte or 2 bytes.

Generally, the ECN field of the first packet that is recovered by the first node does not carry information. In this step, when the first node recovers the first packet, the first node adds the first identification information to the ECN field of the first packet. Because the ECN field may be identified by the first terminal and the second terminal, in this way, a current communications protocol does not need to be modified, and application costs can be reduced.

Optionally, when the ECN field is used to carry the first identification information, the first identification information is used to identify that the current network status indicates network congestion.

S205: A third node receives the service packet, sends the service packet to the at least one second terminal, receives the first packet, and sends the first packet to the at least one second terminal. The third node is a node on a network path between each first terminal and the second terminal communicating with the first terminal, and the third node is an edge node connected to the second terminal.

Optionally, when the second node is an edge node connected to at least one second terminal, the second node and the third node are the same, and the third node is a next-hop node of the first node. The third node receives the service packet sent by the first node, and sends the service packet to the at least one second terminal. When the first node is not the edge node connected to the at least one second terminal, the second node and the third node are two different nodes. After the first node sends the service packet and the first packet, the second node receives and forwards the service packet and the first packet. Finally, the service packet is received by the third node on the overlay network. To be specific, the third node receives the service packet, sends the service packet to the at least one second terminal, receives the first packet, and sends the first packet to the at least one second terminal.

Optionally, when a network tunnel is established between two nodes on the network path, the third node receives the service packet, where a packet header of the service packet includes an outer packet header and an inner packet header, removes the outer packet header of the service packet, and sends, to the at least one second terminal, the service packet from which the outer packet header is removed.

When the service packet is a packet combined by a plurality of service packets, the third node splits the service packet, from which the outer packet header is removed, into the plurality of service packets, where a packet header of each split service packet includes a destination address. The third node sends each split service packet to a corresponding second terminal based on the destination address of each split service packet.

When the service packet is a packet split by the edge node connected to the at least one first terminal, the third node combines a plurality of service packets, from which outer packet headers are removed, into one service packet, where a packet header of the combined service packet includes a destination address. The third node sends the combined service packet to a corresponding second terminal based on the destination address of the combined service packet.

When the service packet is neither a packet obtained through combining nor splitting, the third node directly sends, to the second terminal, the service packet from which the outer packet header is removed.

Optionally, when no network tunnel is established between two nodes on the network path, the third node receives the service packet, and sends the service packet to the second terminal.

Optionally, when a network tunnel is established between two nodes on the network path, the third node receives the first packet, where the packet header of the first packet includes the outer packet header and the inner packet header, removes the outer packet header of the first packet, sets a target field of the inner packet header of the first packet to include the first identification information, and then sends, to the at least one second terminal, the first packet from which the outer packet header is removed.

When the first packet is a packet combined by a plurality of service packets, the third node splits the first packet, from which the outer packet header is removed, into the plurality of service packets, and sets a target field of an inner packet header of each split service packet to include the first identification information. A packet header of each split service packet includes a destination address. The third node sends each split service packet to a corresponding second terminal based on the destination address of each split service packet, so as to send the first packet to the at least one second terminal.

When the first packet is a packet split by the edge node connected to the at least one first terminal, the third node combines a plurality of first packets, from which outer packet headers are removed, into one service packet, and sets a target field of an inner packet header of the combined service packet to include the first identification information. A packet header of the combined service packet includes a destination address. The third node sends each combined service packet to a corresponding second terminal based on the destination address of each split service packet, so as to send the first packet to the at least one second terminal.

When the service packet is neither a packet obtained through combining nor splitting, the third node directly sets the target field of the inner packet header of the first packet, from which the outer packet header is removed, to include the first identification information, and sends, to the second terminal, the first packet from which the outer packet header is removed.

Optionally, when no network tunnel is established between two nodes on the network path, the third node receives the first packet, and sends the first packet to the second terminal.

Optionally, when removing the outer packet of the first packet, the third node may first read the first identification information from the target field in the outer packet header of the first packet, set the target field in the inner packet header of the first packet to include the first identification information, and remove the outer packet header of the first packet.

Optionally, when the target field is an ECN field, the third node reads the first identification information from the ECN field in the outer packet header of the first packet, and sets the ECN field in the inner packet header of the first packet to include the first identification information.

For example, referring to FIG. 3A and FIG. 3B, the third node reads the first identification information from the ECN field in the outer packet header of the first packet, where the first identification information is 11, and sets the value of the ECN field in the inner packet header of the first packet to 11. In this way, the first identification information is moved from the outer packet header of the first packet to the inner packet header.

Optionally, when the target field is a reserved field, the third node reads the first identification information from the reserved field in the outer packet header of the first packet, and sets the reserved field in the inner packet header of the first packet to include the first identification information.

Optionally, when the target field is an option field, the third node reads the first identification information from the option field in the outer packet header of the first packet, adds the option field to the inner packet header of the first packet, and sets the option field in the inner packet header of the first packet to include the first identification information.

S206: The second terminal receives the service packet and the first packet, and sends a first feedback packet to the first terminal, where the first feedback packet includes at least one of the first identification information or second identification information, and the second identification information is identification information obtained based on the first identification information.

The second terminal first receives the service packet, and then receives the first packet. That is, there is a time difference between a time at which the service packet is received and a time at which the first packet is received.

Optionally, after receiving the service packet, the second terminal may determine, based on the service packet, the sequence number of the lost first packet, and send a third feedback packet to the first terminal, where the third feedback packet includes the sequence number of the first packet.

Optionally, the third feedback packet may be a duplicate acknowledge (Dup ACK) packet.

In this step, the second terminal receives the first packet, detects that the first packet includes the first identification information, and sends the first feedback packet to the first terminal, where the first feedback packet includes the first identification information. Alternatively, the second terminal records a quantity of received packets including the first identification information, and the recorded quantity of packets is a quantity of lost packets. The second terminal receives the first packet, detects that the first packet includes the first identification information, and increases the quantity of lost packets. When the quantity of lost packets reaches a preset quantity threshold, the second terminal sends the first feedback packet to the first terminal, where the first feedback packet includes the second identification information, and the second identification information may be the quantity of lost packets, or the second identification information is used to identify that the quantity of lost packets reaches the preset quantity threshold.

Optionally, a target field in a packet header of the first feedback packet includes at least one of the first identification information or the second identification information.

Optionally, when the first terminal communicates with the second terminal through a TCP protocol, the first feedback packet may be an ACK packet, and the target field may be an explicit congestion experience (ECE) field, an option field, or a reserved field in a TCP header of the first feedback packet. Refer to FIG. 3A and FIG. 3B. When the target field is an ECE field, the second terminal generates an ACK packet after detecting that the first packet includes the first identification information. An ECE field in the TCP packet header of the ACK packet includes the first identification information, or a reserved field in the TCP packet header of the ACK packet includes the first identification information. When the target field is an option field, after detecting that the first packet includes the first identification information, the second terminal generates the ACK packet, adds an option field to the TCP packet header of the ACK packet, and sets the added option field to include the first identification information. Optionally, when the ECN field of the first packet is used to carry the first identification information, the ECE field of the first feedback packet is used to carry the first identification information.

In addition, FIG. 3A and FIG. 3B further show a congestion window reduction (CWR) field in the TCP packet header of the ACK packet.

Optionally, when the first terminal communicates with the second terminal through a real-time transport protocol (RTP) protocol, the first feedback packet is an explicit congestion notification echo (ECN Echo) packet, and a congestion experience marked packet (Number CE Marked Packets) field in the ECN Echo packet includes the second identification information.

Alternatively, the first feedback packet is an explicit congestion experience counter (ECN-CE Counter) field that is of an RTP/AVPF transport-layer explicit congestion notification feedback packet (RTP/AVPF Transport-Layer ECN Feedback Packet), and that includes the second identification information.

The full name of AVPF is RTP Audio-Visual Profile with Feedback, and the Chinese full name of is real-time transport protocol/audio-visual profile with feedback.

The first terminal may communicate with the second terminal through another protocol, other than the TCP protocol or the RTP protocol. For other protocols, details are not described herein.

After the second terminal sends the first feedback packet, the first feedback packet is transmitted to the first terminal through a node on the network path.

S207: The first terminal detects, according to the packet acknowledgment mechanism, that a packet is lost in the service packet sent to the second terminal, and sends a second packet to the second terminal, where the second packet is the lost packet.

This step is an optional step. When the first terminal communicates with the second terminal through the TCP protocol, the first terminal detects, according to the packet acknowledgment mechanism, that a packet in the service packet sent to the second terminal is lost, and sends the second packet to the second terminal. When the first terminal communicates with the second terminal through the RTP protocol, the first terminal may not detect whether the packet is lost and may not send the second packet to the second terminal.

Optionally, in this step, the following two implementation manners may be used, and the two implementation manners are described as follows:

First manner: After the first terminal sends the at least one service packet, if a packet is lost in a process of transmitting the at least one service packet, the second terminal may receive only a portion of the at least one service packet. The second terminal determines, based on the received service packet, a sequence number of the lost first packet, and sends a third feedback packet to the first terminal, where the third feedback packet includes the sequence number of the first packet. The first terminal receives the third feedback packet, detects, based on the sequence number of the first packet included in the third feedback packet, that the first packet is lost, and obtains the service packet corresponding to the sequence number of the first packet. For ease of description, the obtained service packet is referred to as the second packet.

Second manner: The first terminal sends the at least one service packet to the second terminal, and starts a timer corresponding to each service packet that is sent. The second terminal receives the service packet, sends an acknowledgment message corresponding to the service packet to the first terminal. If the first terminal does not receive the acknowledgment message corresponding to the service packet when a time counted by the timer of the service packet reaches a preset time threshold, the first terminal detects that the service packet is lost. In this case, the first node detects, according to the packet acknowledgment mechanism, that a packet is lost. For ease of description, the lost packet is referred to as the first packet.

Optionally, when detecting that a packet is lost, the first terminal further reduces a service packet sending rate.

In this step, the first terminal may send only the second packet, and may send another service packet other than the second packet.

S208: The first terminal receives the first feedback packet, and reduces the service packet sending rate based on the first identification information and/or the second identification information included in the first feedback packet.

In this step, the second identification information is the quantity of lost packets or the second identification information is used to identify that the quantity of lost packets reaches the preset quantity threshold. When the second identification information is the quantity of lost packets or the second identification information is used to identify that the quantity of lost packets reaches the preset quantity threshold, the service packet sending rate may be reduced by a preset value. When the second identification information is the quantity of lost packets, a value may be determined based on the quantity of lost packets, and the service packet sending rate is reduced by the value.

Optionally, the first terminal determines, based on the first identification information included in the first feedback packet, to skip using the first feedback packet to calculate an RTT of the first packet.

Optionally, the ECE field of the first feedback packet includes the first identification information, and the first terminal may determine based on the first identification information, skip using the first feedback packet to calculate the RTT of the first packet, or calculate the RTT of the first packet based on the first feedback packet.

Generally, when receiving the first feedback packet, the first terminal calculates the RTT of the first packet. However, in this step, because the first feedback packet includes the first identification information, it indicates that the first packet is a packet recovered according to the local recovery mechanism by the node on the overlay network, the RTT of the first packet calculated based on the first feedback packet is inaccurate. Therefore, in this step, the first terminal determines, based on the first identification information, skip calculating the RTT of the first packet.

When the first terminal communicates with the second terminal through the TCP protocol, this embodiment includes the following S209 and S210. When the first terminal communicates with the second terminal through the RTP protocol, this embodiment does not include the following S209 and S210.

S209: The second terminal receives the second packet, and sends a second feedback packet to the first terminal when detecting that the received first packet and the second packet are the same, where the second feedback packet is used to indicate that the second packet is a falsely retransmitted packet.

Optionally, the second feedback packet may include a sequence number of the second packet. If the communications protocol used by the first terminal communicating with the second terminal is the TCP protocol, the second feedback packet may be a dup SACK packet, where the dup SACK packet includes the sequence number of the second packet.

If the first terminal sends a service packet other than the second packet, the second terminal further receives the service packet.

S210: The first terminal receives the second feedback packet, and determines, based on the first identification information and the second feedback packet included in the first feedback packet, that a reason why a service packet sending rate continues to decrease and/or that a reason of the falsely retransmitted packet is due to the recovery, according to the local recovery mechanism, performed on a packet lost on a network.

In this step, the first terminal determines, based on the first identification information and the second feedback packet, that the reason why the service packet sending rate continues to decrease and/or that the reason of the falsely retransmitted packet is due to the recovery, according to the local recovery mechanism, performed on the packet lost on the network.

Generally, the first terminal determines, based on the sequence number that is of the lost first packet and that is included in the second feedback packet, that the first packet received by the second terminal is received at a later time because of network disorder. The first terminal determines that the first packet is not lost, and then determines to start to recover the service packet sending rate. However, in this step, because the first feedback packet includes the first identification information and/or the second identification information, the first terminal determines, based on the first identification information and/or the second identification information, and the second feedback packet, that the first packet received by the second terminal is a packet recovered according to a local mechanism by the node on the overlay network. Therefore, the first terminal further determines that the first packet is lost and that a current network status indicates network congestion. In this case, the first terminal continues to reduce the service packet sending rate, to avoid worsening network congestion.

In this embodiment of this application, the first node receives the service packet, sends the service packet, detects that a packet is lost after sending the service packet, recovers the lost packet according to the local recovery mechanism to obtain the first packet, adds, to the first packet, the first identification information related to the local recovery, and sends the first packet. When the first packet is lost, the first node recovers the first packet according to the local recovery mechanism and sends the first packet. There is no need to wait for the first terminal to resend the first packet to the second terminal, and this reduces a transmission delay. In addition, because the first packet includes the first identification information related to the local recovery, the first terminal may be notified, through the first identification information, that the first packet is recovered by the first node by performing the local recovery. When receiving the first packet, the second terminal sends the first feedback packet to the first terminal, where the first feedback packet includes at least one of the first identification information and the second identification information. In this case, the first terminal may determine, based on the first identification information and the second identification information, to reduce the service packet sending rate, and avoid severe congestion. In addition, when the quantity of times for which the first packet is recovered reaches the preset quantity threshold, the first identification information is added to the first packet. When the quantity of times for which the first packet is recovered reaches the preset quantity threshold, it indicates that the quantity of times for which the packet is lost on the network is greater than or equal to the preset quantity threshold, and the network is indeed congested. The first terminal reduces a packet sending rate when detecting that the first packet is lost, and adds the first identification information to the first packet. After obtaining the first identification information, the first terminal continues to reduce the packet sending rate. When the quantity of times for which the first packet is recovered does not reach the preset quantity threshold, it indicates that the quantity of times for which the packet is lost on the network is less than the preset quantity threshold, and the network may be congested or not congested. When no congestion occurs, the quantity of times for which the first packet is recovered does not reach the preset quantity threshold. In this case, the first identification information is not added to the first packet. When receiving the first packet, the second terminal sends a first feedback packet to the first terminal, where the first feedback packet does not include the first identification information. When receiving the first packet sent by the first terminal, the second terminal sends a second feedback packet to the first terminal. Because the first feedback packet does not include the first identification information, the first terminal recovers a service packet sending rate when receiving the second feedback packet. This improves transmission efficiency. It should be further noted that, when the depth of the forwarding queue on the first node exceeds the preset depth threshold, it indicates that the current network status indicates network congestion. Therefore, the first node adds the first identification information to the first packet when the network status monitored by the first node indicates network congestion, or when the depth of the forwarding queue on the first node exceeds the preset depth threshold. In this case, when the first identification information is transmitted to the first terminal, the first terminal accurately determines the current network status based on the first identification information, and sends the packet based on the accurately determined network status. This further improves the transmission efficiency.

Figure 7A:
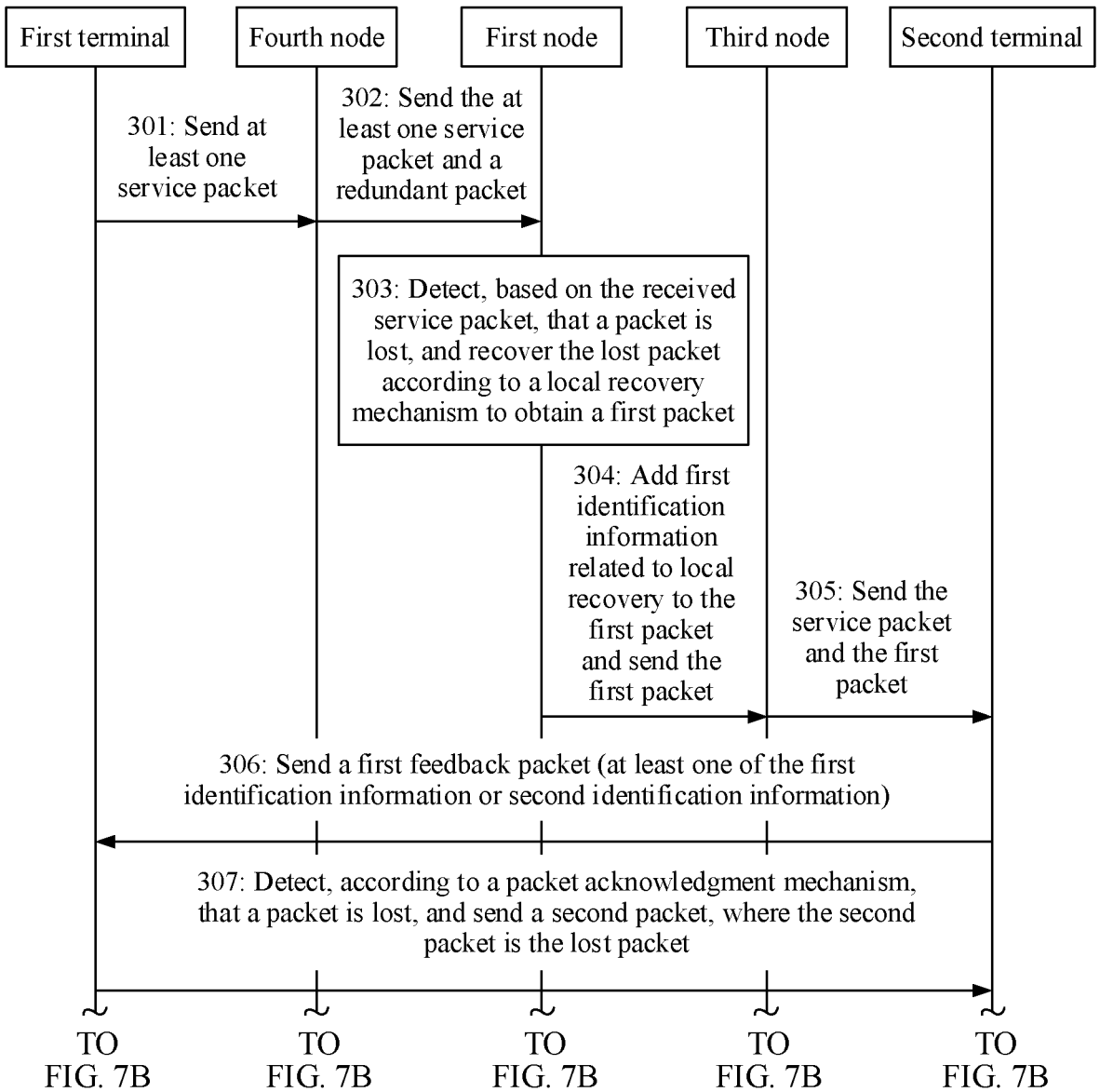
FIG. 7A and FIG. 7B are a flowchart of another communications method according to this application.
Figure 7B:
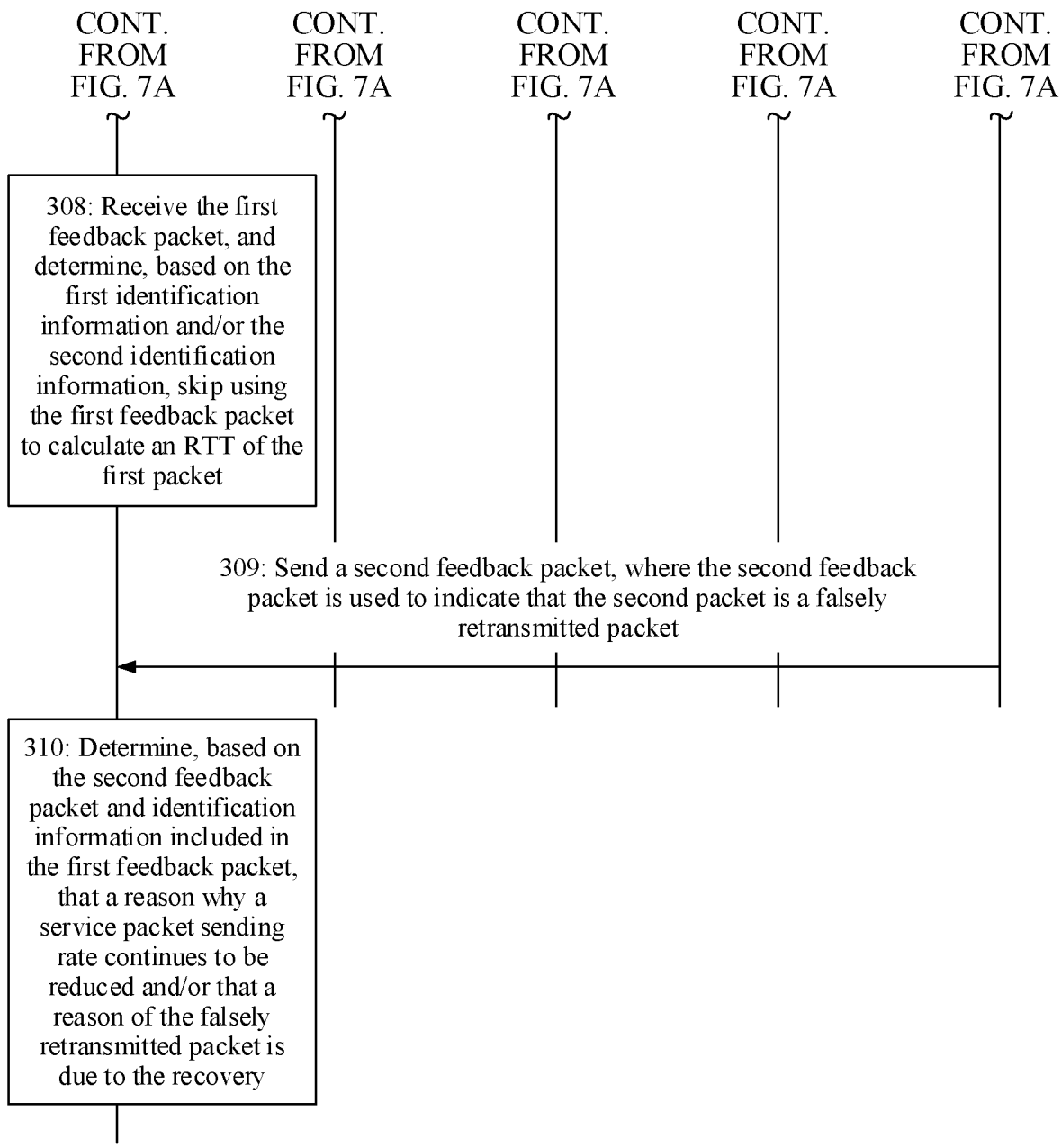

Refer to FIG. 7A and FIG. 7B. An embodiment of this application provides a communications method. The communications method may be applied to the network architecture shown in FIG. 1, and includes the following steps.

S301: A first terminal sends at least one service packet to a second terminal.

There may be one or more first terminals, and there may be one or more second terminals. In other words, at least one first terminal sends the service packet to at least one second terminal.

For each first terminal, the first terminal sends at least one service packet to one second terminal, where the sequence numbers of the at least one service packet may be consecutive.

The first terminal and the second terminal are connected to an overlay network. The at least one service packet sent by the first terminal to the second terminal is received by a node on the overlay network. Then, the node forwards the service packet to the second terminal. Detailed implementation is as follows:

S302: A fourth node receives the at least one service packet, and sends the at least one service packet and a redundant packet, where the redundant packet includes redundant information of the at least one service packet, and the fourth node is an edge node connected to the at least one first terminal on the overlay network.

In this step, in a case in which a network tunnel is established between nodes on the network path on the overlay network, when receiving the at least one service packet sent by the at least one first terminal, the fourth node may combine the at least one service packet. To be specific, the fourth node combines a plurality of service packets into one service packet. The packet headers of the plurality of service packets are used as an inner packet header of the combined service packet. The fourth node numbers the combined service packet and adds an outer packet header to the combined service packet, where the outer packet header includes a sequence number of the numbered service packet, and sequence numbers of the combined service packet are assigned consecutively. Then, the fourth node generates a redundant packet based on the combined service packet, and sends the combined service packet and the generated redundant packet to a next-hop node.

Alternatively, when receiving the at least one service packet sent by the at least one first terminal, the fourth node may split the received service packet. To be specific, the edge node splits one service packet into a plurality of service packets. A packet header of the one service packet is used as inner packet headers of the split service packets. The edge node numbers the split service packets and adds outer packet headers to the split service packets, where the outer packet headers include sequence numbers of the numbered service packets, and the sequence numbers of the split service packets are consecutive. Then, the fourth node generates a redundant packet based on the split service packets, and sends the split service packets and the generated redundant packet to a next-hop node.

Alternatively, when receiving the at least one service packet sent by the at least one first terminal, the fourth node may number the received service packet and add an outer packet header to the received service packet, where the outer packet header includes a sequence number of the numbered service packet. An original packet header of the received packet is used as an inner packet header. Sequence numbers of numbered service packets are assigned consecutively. Then, the fourth node generates a redundant packet based on the service packet to which the outer packet header is added, and sends, to a next-hop node, the generated redundant packet and the service packet to which the outer packet header is added.

When no network tunnel is established between the nodes on the network path on the overlay network, the fourth node receives the service packet sent by one first terminal, and numbers the received service packet. A packet header of the service packet includes a sequence number. Sequence numbers of service packets are assigned consecutively. Then, the fourth node generates a redundant packet based on the received service packet, and sends the received service packet and the generated redundant packet to a next-hop node.

S303: The first node receives the service packet and the redundant packet. When detecting, based on the received service packet, that a packet is lost, the first node recovers the lost packet according to the local recovery mechanism to obtain a first packet.

Because the sequence numbers of service packets sent by the fourth node are consecutive, if a packet is lost in a process where the fourth node transmits the service packets to the first node, the first node may detect, based on the sequence numbers of the received service packets, whether a packet is lost. If the first node detects that a packet is lost, the sequence number of the lost packet is also detected. For example, the fourth node sends service packets whose sequence numbers are 1, 2, 3, 4, 5, and 6. Then, the first node receives the service packets whose sequence numbers are 1, 2, 4, 5, and 6, and detects, based on the sequence numbers 1, 2, 4, 5, and 6, that a packet is lost and that the sequence number of the lost packet is 3.

In addition, before sending the service packets, the fourth node may notify the first node of a quantity of service packets sent by the fourth node each time. Then, the first node receives and records the quantity. In this case, each time the first node receives a service packet sent by the fourth node, the first node detects, based on the quantity of the received service packet and a recorded quantity, whether a packet is lost, and further detects a sequence number of the lost packet when detecting that a packet is lost. For example, the fourth node notifies the first node that the quantity of service packets sent by the fourth node each time is 6, and the fourth node sends service packets whose sequence numbers are 1, 2, 3, 4, 5, and 6. The first node receives the service packets whose sequence numbers are 1, 2, 3, 4, and 5, and detects, based on the recorded number 6, that a packet is lost, and the sequence number of the lost packet is 6.

In this step, the local recovery mechanism indicates that the first node obtains the lost first packet based on the received service packet and the redundant packet.

S304: The first node adds first identification information related to local recovery to the first packet and sends the first packet.

The local recovery refers to packet recovery implemented by the first node.

Optionally, the first identification information is used to identify that the first packet is a packet recovered according to the local recovery mechanism, or the first identification information is used to identify that a current network status indicates network congestion.

Optionally, in the case in which the first identification information is used to identify that the first packet is a packet recovered according to the local recovery mechanism, the first identification information is used to identify that the first packet is a packet recovered according to the local recovery mechanism by a node on the network path on the overlay network. Alternatively, the first identification information is used to identify that the first packet is a packet recovered by the first node according to the local recovery mechanism.

Optionally, the first identification information is used to identify a status of a network between the first node and a neighboring node of the first node, or is used to identify a status of a network between the first node and a node connected to the first node.

In this step, when recovering the first packet, the first node adds the first identification information to the first packet. Alternatively, the first node adds the first identification information to the first packet when network status information monitored by the first node indicates network congestion, or when a depth of a forwarding queue on the first node exceeds a preset depth threshold.

The forwarding queue is used to store a packet that is received by the first node and that is not sent. The depth of the forwarding queue refers to a quantity of packets stored in the forwarding queue. When the depth of the forwarding queue exceeds a preset depth threshold, it indicates that the forwarding queue stores a large quantity of packets that are not sent in time and a current network status is network congestion.

Optionally, a target field in a packet header of the first packet includes the first identification information.

Optionally, when a network tunnel is established between the first node and the fourth node, the first packet includes an outer packet header and an inner packet header, and the target field may be a field in the outer packet header of the first packet. Optionally, the target field may be a field in an outer IP packet header of the first packet.

Optionally, the target field may be an ECN field, an option field, a reserved field, or the like in the packet header of the first packet.

In the case in which the packet header of the first packet includes an outer packet header and an inner packet header, the first identification information may be added to the target field in the outer packet header of the first packet in the following two manners. The two manners are described as follows:

In a first manner, the ECN field or the reserved field in the outer packet header of the first packet is set to include the first identification information.

Figure 8A:
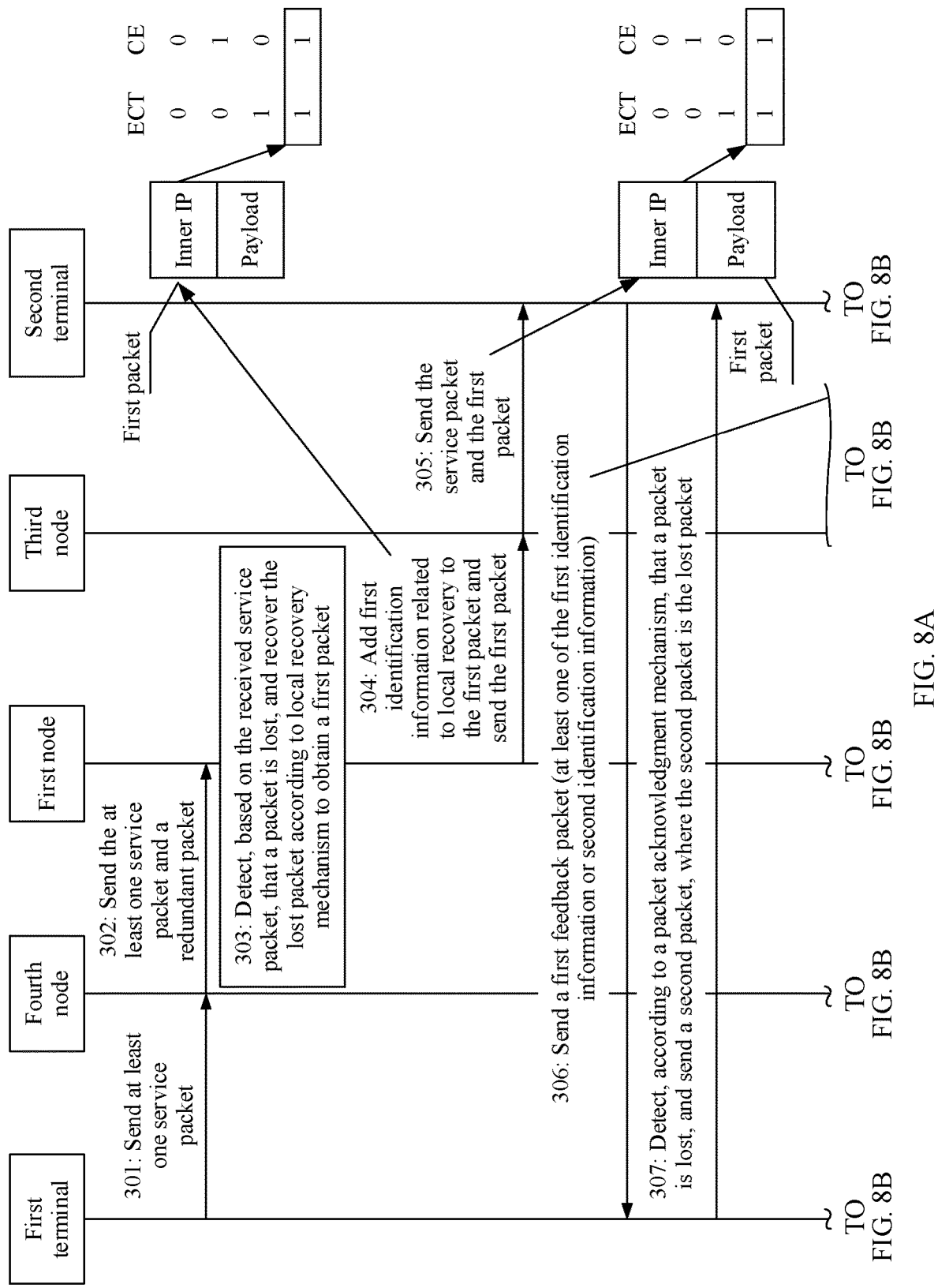
FIG. 8A and FIG. 8B are another schematic diagram of adding first identification information to a first packet according to this application.
Figure 8B:
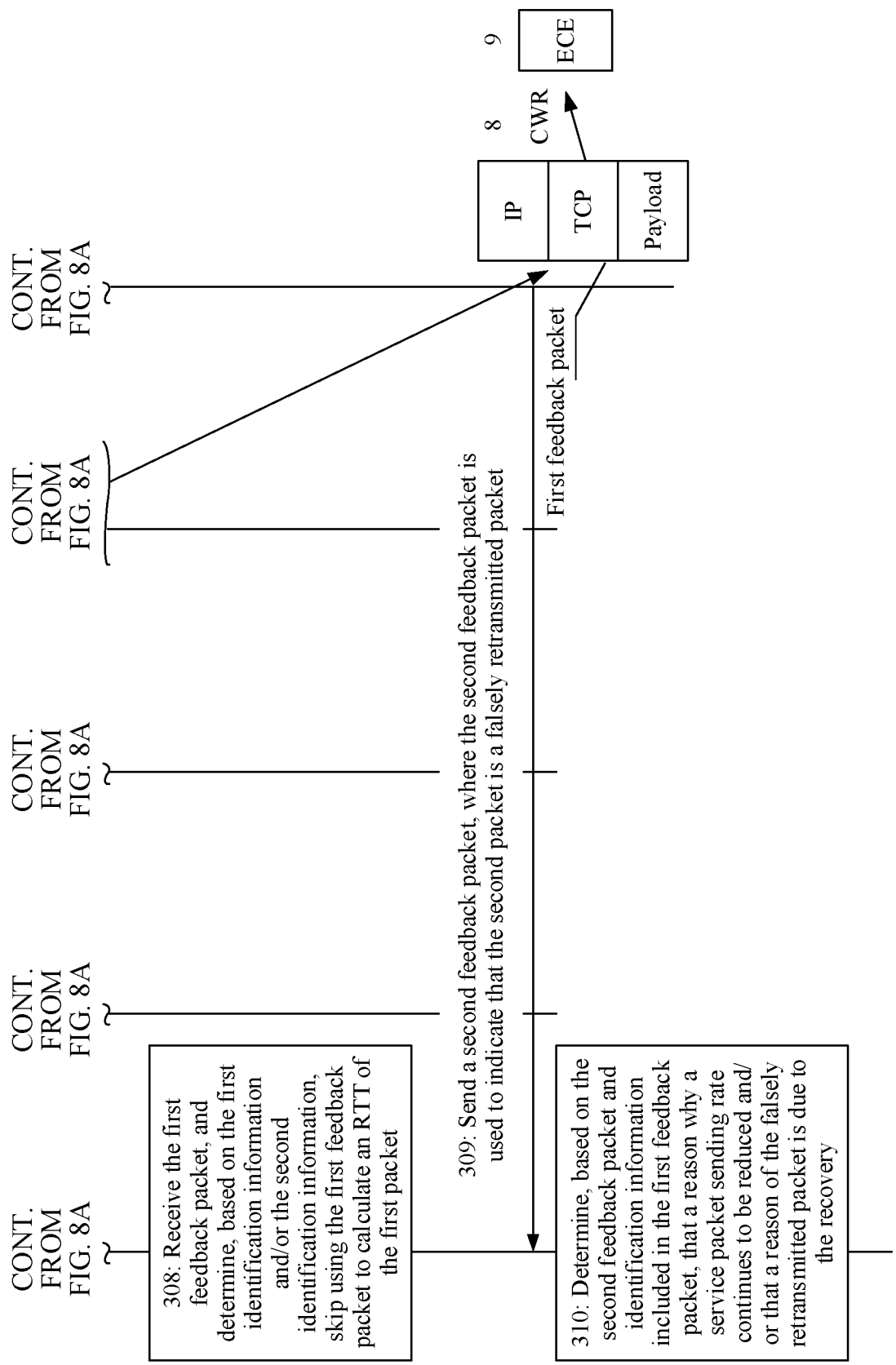

Refer to FIG. 8A and FIG. 8B. The ECN field in the outer packet header of the first packet includes two bits, where the two bits are respectively ECT and CE. A value of the ECT is set to a first preset bit value and a value of the CE is set to a second preset bit value. That is, the first preset bit value and the second preset bit value may be used to represent the first identification information.

For example, in the example in FIG. 8A, both the first preset bit value and the second preset bit value are 1, that is, a bit 11 is used to represent the first identification information. The first preset bit value and the second preset bit value shown in FIG. 8A are merely examples. The first preset bit value and the second preset bit value may alternatively be other values. Details are not described herein.

Figure 9A:
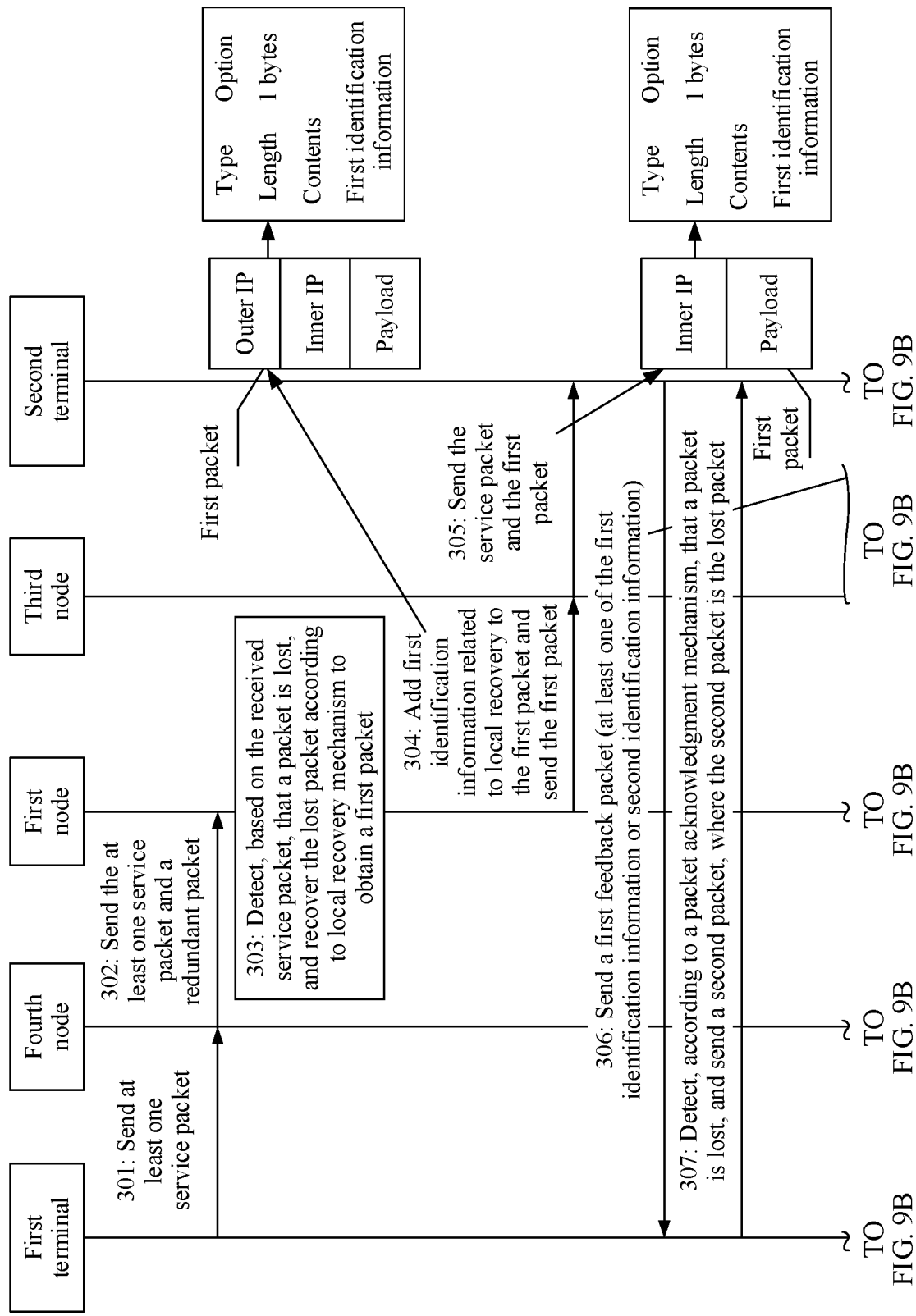
FIG. 9A and FIG. 9B are another schematic diagram of moving first identification information according to this application.
Figure 9B:
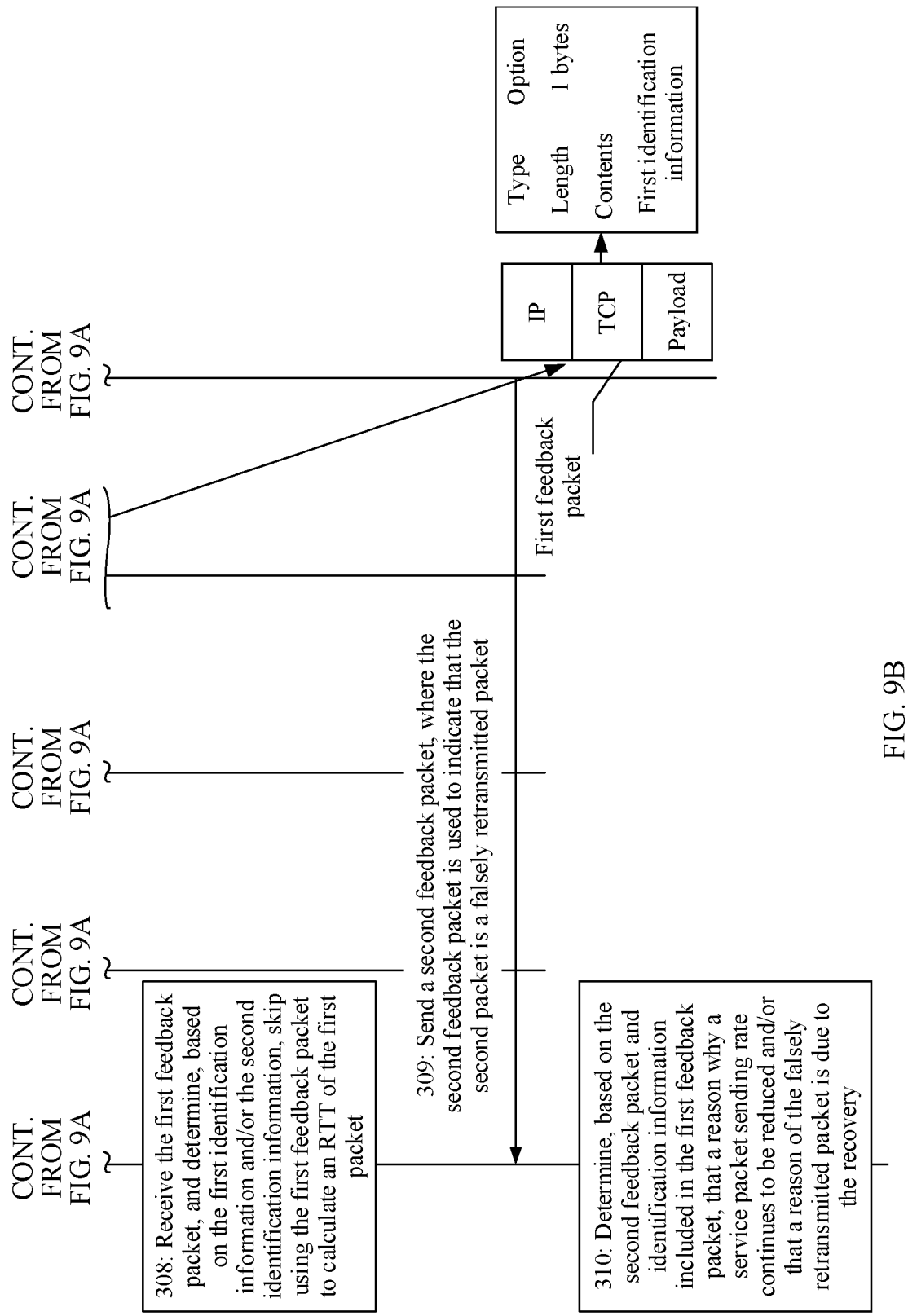

In a second manner, referring to FIG. 9A and FIG. 9B, the option field is added to the outer packet header of the first packet, and the option field is set to include the first identification information.

Optionally, a length of the option field may be a preset length. For example, the length of the option field may be a length of 1 byte or 2 bytes.

Optionally, when no network tunnel is established between the first node and the fourth node, the target field may be a target field in the packet header of the first packet. Optionally, the target field may be a field in the IP packet header of the first packet. The first identification information may be added to the target field in the packet header of the first packet in the following two manners. The two manners are described as follows:

In a first manner, the ECN field or the reserved field in the packet header of the first packet is set to include the first identification information.

Figure 10A:
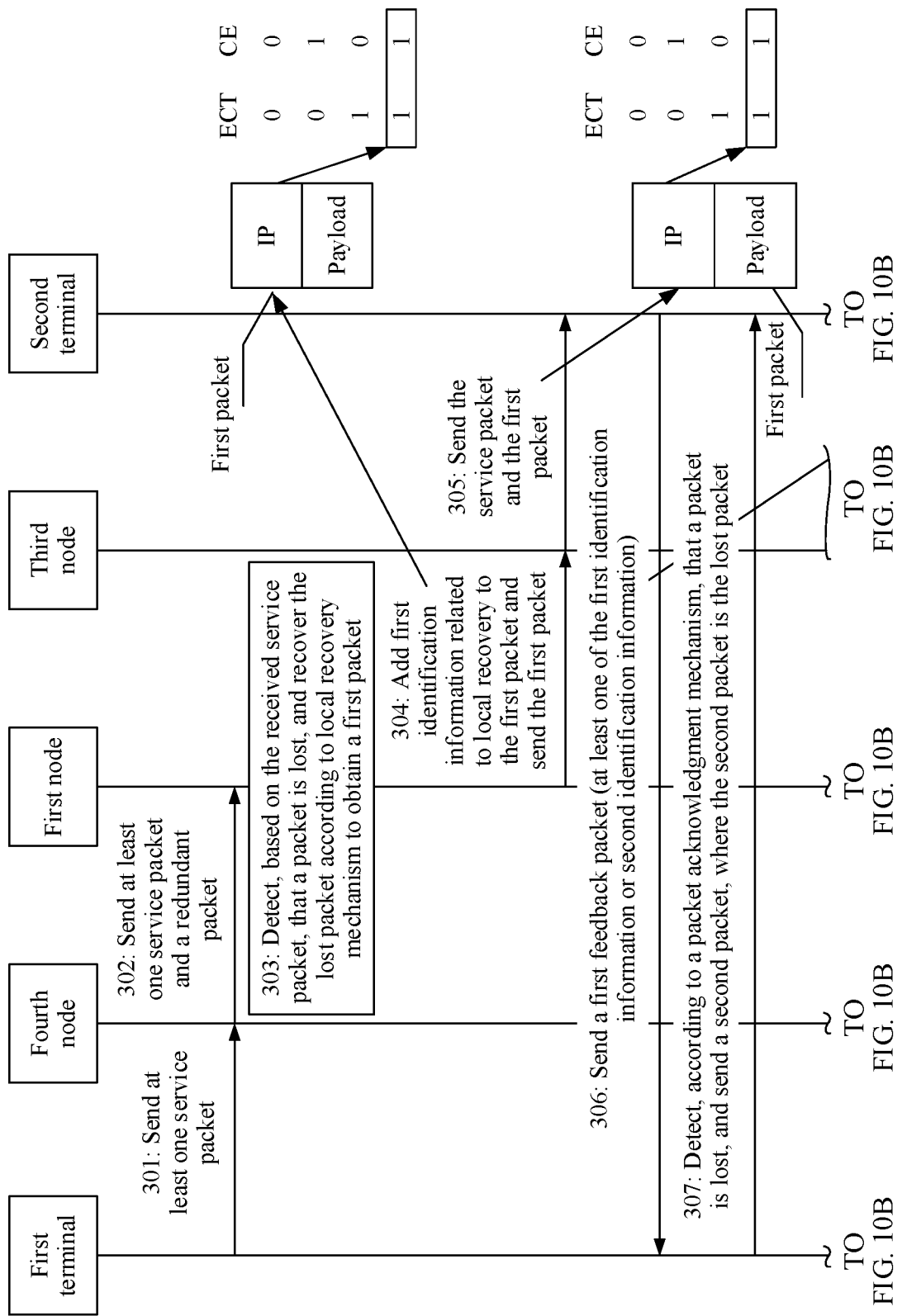
FIG. 10A and FIG. 10B are another schematic diagram of adding first identification information to a first packet according to this application.
Figure 10B:
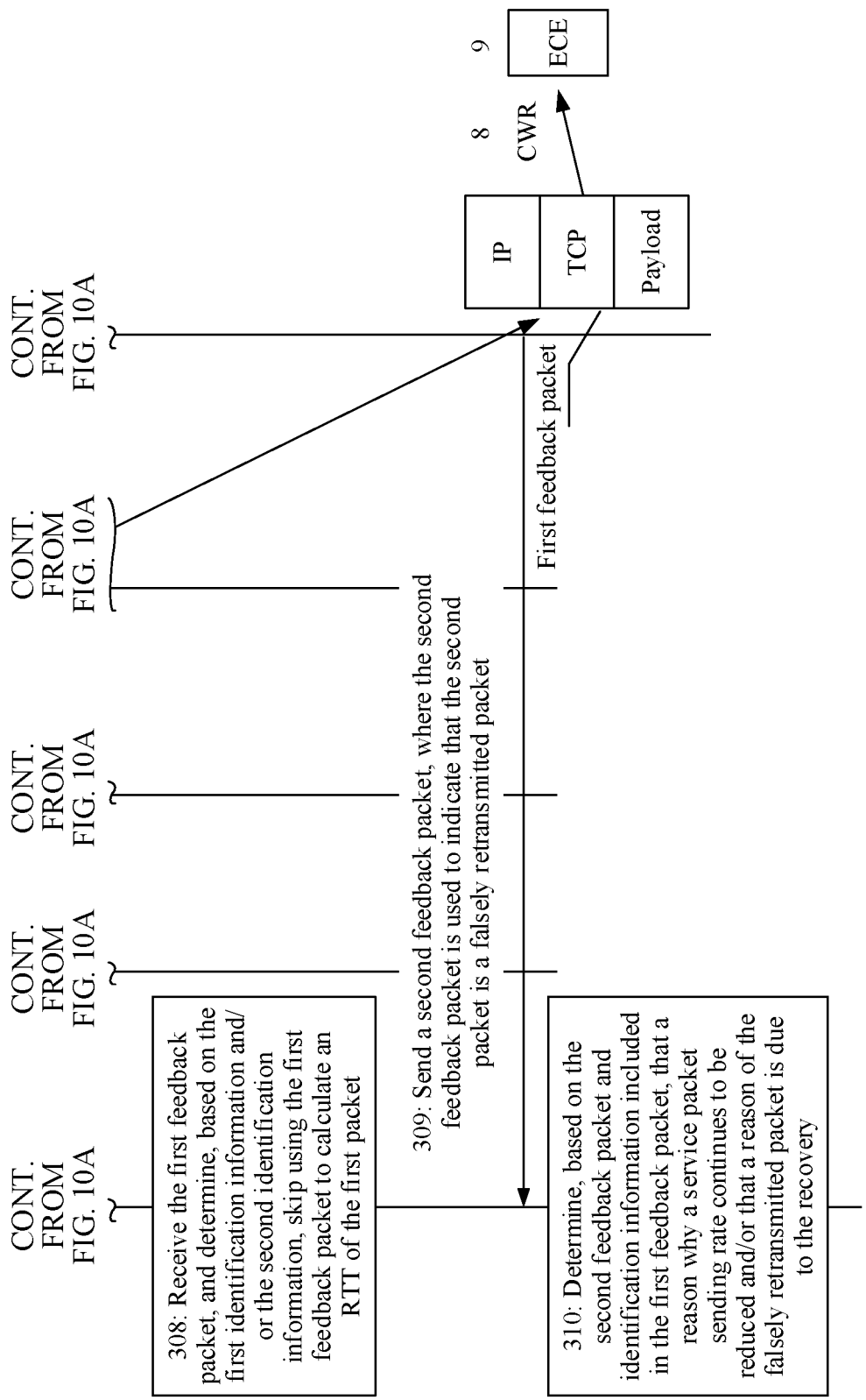

Refer to FIG. 10A and FIG. 10B. The ECN field in the outer packet header of the first packet includes two bits, where the two bits are respectively ECT and CE. A value of the ECT is set to a first preset bit value and a value of the CE is set to a second preset bit value. That is, the first preset bit value and the second preset bit value may be used to represent the first identification information.

For example, in the example in FIG. 10A, both the first preset bit value and the second preset bit value are 1, that is, a bit 11 is used to represent the first identification information. The first preset bit value and the second preset bit value shown in FIG. 10A are merely examples. The first preset bit value and the second preset bit value may alternatively be other values. Details are not described herein.

Figure 11A:
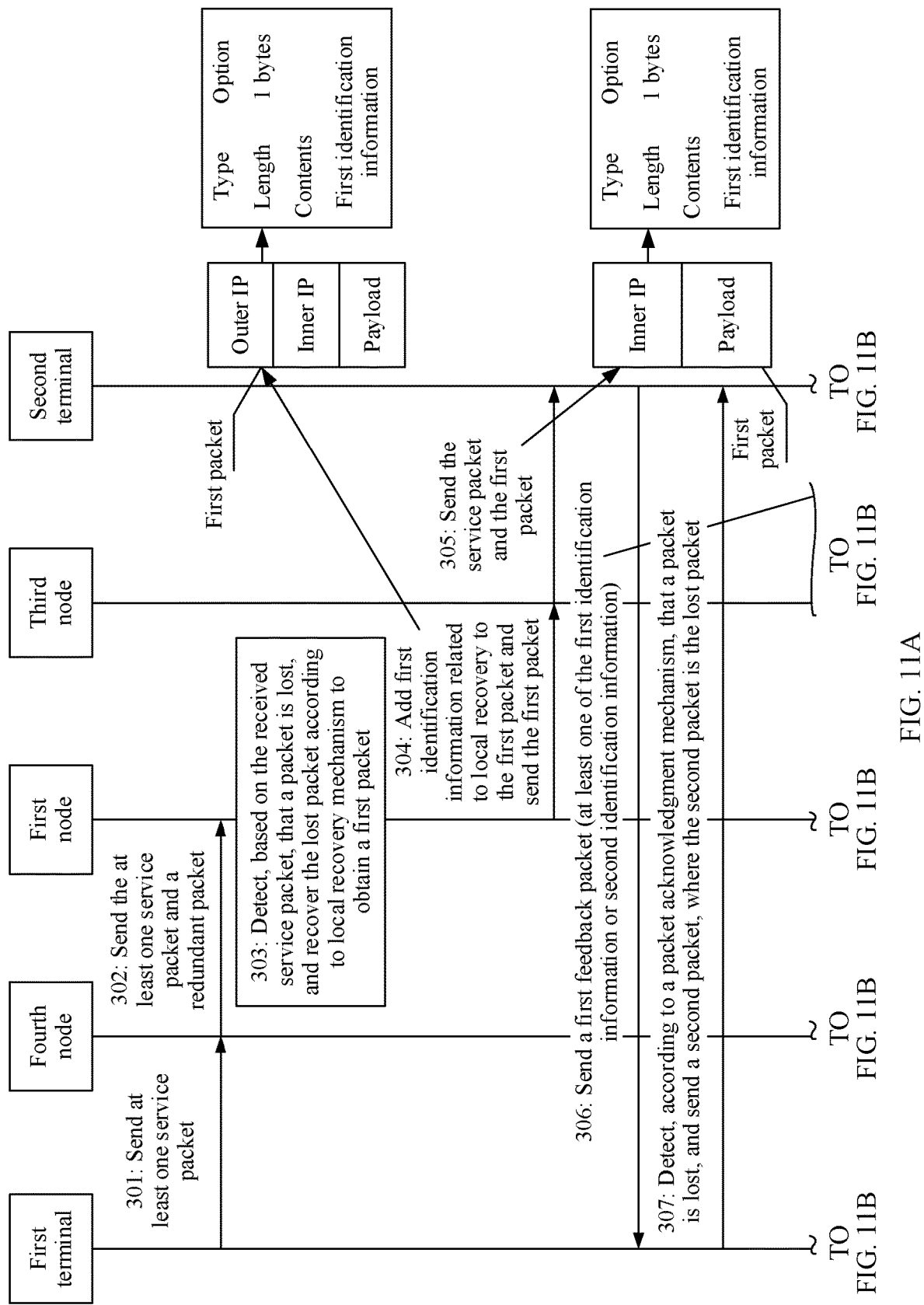
FIG. 11A and FIG. 11B are another schematic diagram of moving first identification information according to this application.
Figure 11B:
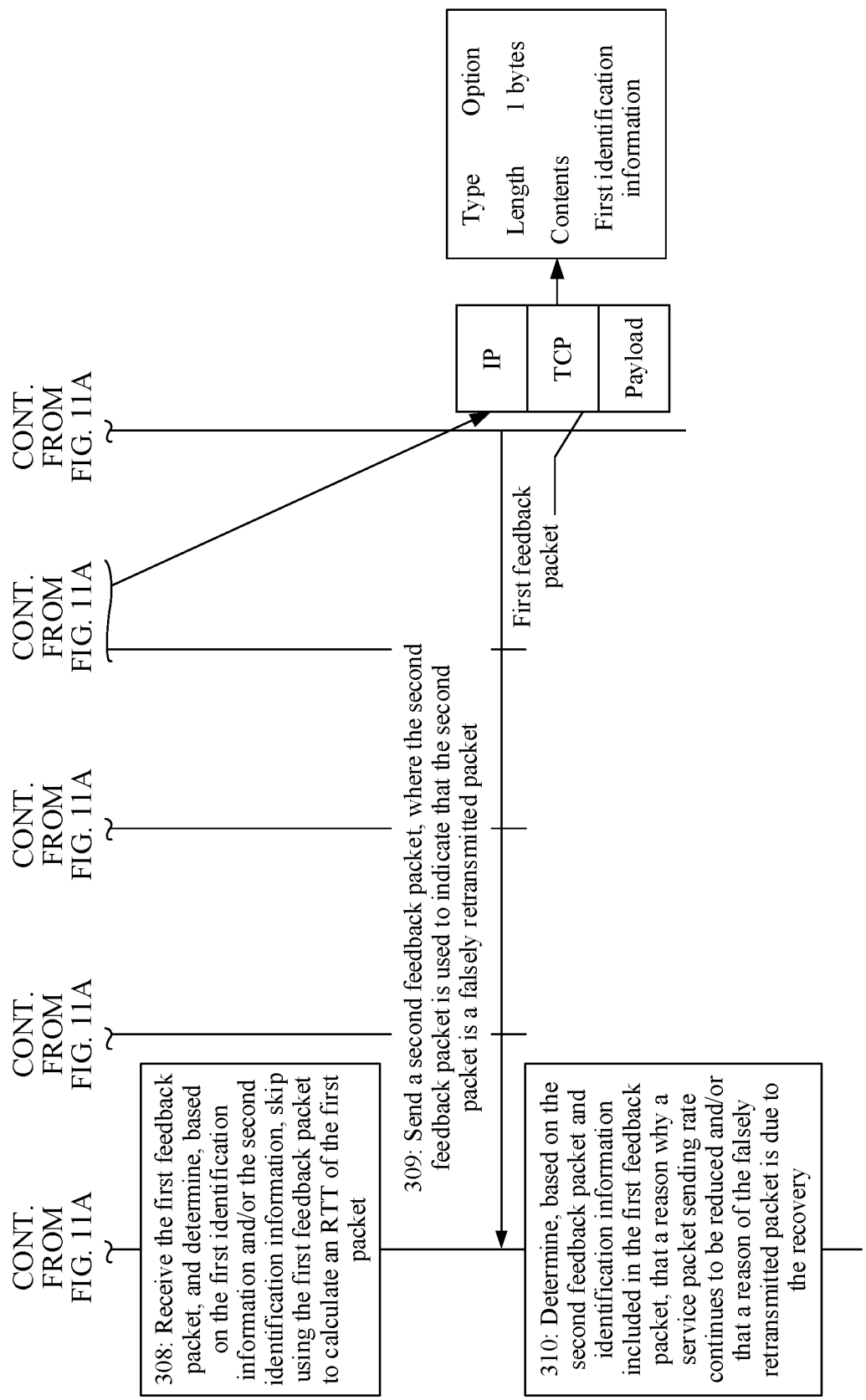

In a second manner, referring to FIG. 11A and FIG. 11B, the option field is added to the packet header of the first packet, and the option field is set to include the first identification information.

Optionally, a length of the option field may be a preset length. For example, the length of the option field may be a length of 1 byte or 2 bytes.

Generally, the ECN field that is of the first packet and that is recovered by the first node does not carry information. In this step, when the first node recovers the first packet, the first node adds the first identification information to the ECN field of the first packet. Because the ECN field may be identified by the first terminal and the second terminal, in this way, a current communications protocol does not need to be modified, and application costs may be reduced.

Optionally, when the ECN field is used to carry the first identification information, the first identification information is used to identify that the current network status indicates network congestion.

Steps S305 to S310 is the same as steps S205 to S210 respectively, and details are not described herein again.

In this embodiment of this application, the first node receives the service packet and the redundant packet, detects that the packet is lost based on the received service packet, recovers the lost packet based on the received service packet and the redundant packet to obtain the first packet, adds the first identification information related to the local recovery to the first packet, and sends the first packet. When the first packet is lost, the first node recovers the first node and sends the first packet. There is no need to wait for the first terminal to resend the first packet to the second terminal, and this reduces a transmission delay. In addition, because the first packet includes the first identification information related to the local recovery, the first terminal may be notified, through the first identification information, that the first packet is recovered by the first node by performing the local recovery. When receiving the first packet, the second terminal sends the first feedback packet to the first terminal, where the first feedback packet includes at least one of the first identification information and the second identification information. In this case, the first terminal may determine, based on the first identification information and the second identification information, to reduce the service packet sending rate, and avoid severe congestion.

Figure 12:
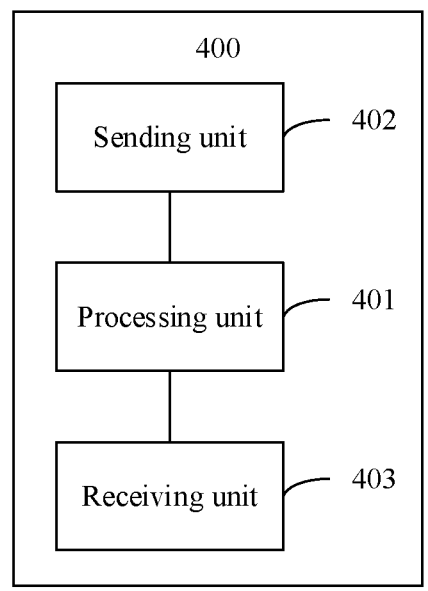
FIG. 12 is a schematic structural diagram of a communications apparatus according to this application.

Refer to FIG. 12. An embodiment of this application provides a communications apparatus 400. The different units described below may be implemented as hardware circuits or as software or as software implemented on specialized or general processors. The apparatus 400 is deployed on a first node in any one of the foregoing embodiments, and includes:

a processing unit 401, configured to recover, when detecting that a first packet is lost, the first packet according to a local recovery mechanism, where the first packet is a packet obtained based on a packet sent by at least one first terminal to at least one second terminal, and the apparatus is a node on a network path between each first terminal and a second terminal communicating with the first terminal; where the processing unit 401 is further configured to add first identification information that is related to local recovery to the first packet; and a sending unit 402, configured to send the first packet.

Optionally, the first identification information is used to identify that the first packet is a packet recovered according to the local recovery mechanism, the first identification information is used to identify a quantity of times for which the first packet is recovered, or the first identification information is used to identify that a current network status indicates network congestion.

Optionally, the apparatus 400 further includes:
a receiving unit 403, configured to receive the first packet.

The sending unit 402 is further configured to send the first packet to a second node, where the second node is another node, other than the apparatus, on the network path between each first terminal and the second terminal communicating with the first terminal.

The processing unit 401 is further configured to detect, according to a packet acknowledgment mechanism, that the first packet is lost in a process of transmitting the first packet to the second node.

Optionally, the processing unit 401 is configured to:
add the first identification information to the first packet, when a quantity of times for which the first packet is recovered reaches a preset quantity threshold, when network status information monitored indicates network congestion, or when a depth of a forwarding queue on the apparatus exceeds a preset depth threshold.

Optionally, the apparatus 400 is another node other than an edge node connected to each first terminal, and the processing unit 401 is configured to:
obtain the first packet according to a received redundant packet and a received service packet, where the service packet and the first packet are packets obtained based on the packet sent by the at least one first terminal to the at least one second terminal, and the redundant packet includes redundant information of the packet sent by the at least one first terminal to the at least one second terminal.

Optionally, the processing unit 401 is configured to:
add the first identification information to the first packet, when network status information indicates network congestion, or when a depth of a forwarding queue on the apparatus exceeds a preset depth threshold.

Optionally, a target field in a packet header of the first packet includes the first identification information.

Optionally, the packet header of the first packet includes an outer packet header and an inner packet header, and the target field is an explicit congestion notification (ECN) field, an option field, or a reserved field in the outer packet header.

In this embodiment of this application, when detecting that a first packet is lost, the processing unit recovers the first packet according to the local recovery mechanism, where the first packet is a packet obtained based on a packet sent by at least one first terminal to at least one second terminal. Then the processing unit adds the first identification information related to the local recovery; and the sending unit sends the first packet. When the first packet is lost, the processing unit recovers the first packet according to the local recovery mechanism and sends the first packet. There is no need to wait for the first terminal to resend the first packet to the second terminal, and this reduces a transmission delay. In addition, because the first packet includes the first identification information related to the local recovery, the first terminal may be notified, through the first identification information, that the first packet is recovered by the first node by performing the local recovery.

Figure 13:
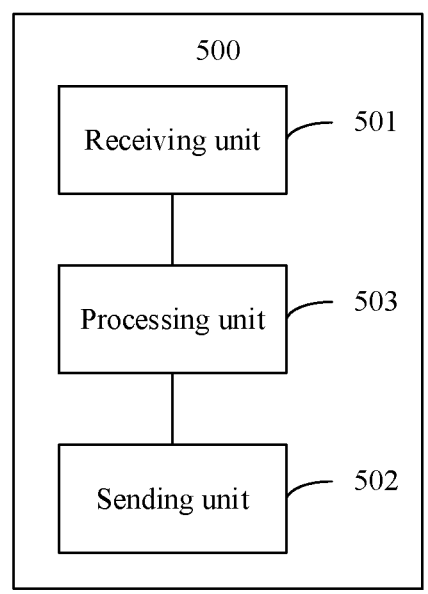
FIG. 13 is a schematic structural diagram of another communications apparatus according to this application.

Refer to FIG. 13. An embodiment of this application provides a communications apparatus 500. The apparatus 500 is deployed on a third node in any one of the foregoing embodiments, and includes:

a receiving unit 501, configured to receive a first packet sent by a first node, where the first packet includes first identification information related to local recovery, the first packet is obtained based on a packet sent by at least one first terminal to at least one second terminal, the first node and the apparatus are nodes on a network path between each first terminal and a second terminal communicating with the first terminal; and a sending unit 502, configured to send the first packet to the at least one second terminal.

Optionally, the first identification information is used to identify that the first packet is a packet recovered according to the local recovery mechanism, the first identification information is used to identify a quantity of times for which the first packet is recovered, or the first identification information is used to identify that a current network status indicates network congestion.

Optionally, the apparatus is an edge node connected to the at least one second terminal, the packet header of the first packet includes an outer packet header and an inner packet header, and a target field in the outer packet header includes the first identification information.

The apparatus 500 further includes a processing unit 503.

The processing unit 503 is configured to remove the outer packet header of the first packet 503, and set a target field in the inner packet header of the first packet to comprise the first identification information.

Optionally, the target field is an explicit congestion notification (ECN) field, an option field, or a reserved field.

In this embodiment of this application, the receiving unit receives the first packet sent by the first node, where the first packet includes the first identification information related to the local recovery, the first packet is a packet obtained based on a packet sent by the at least one first terminal to the at least one second terminal, and the local recovery is packet recovery implemented by the first node. Then, the sending unit sends the first packet to the at least one second terminal. Because the first packet is a packet recovered by the first node, there is no need to wait for the first terminal to resend the first packet to the second terminal, and this reduces a transmission delay. In addition, because the first packet includes the first identification information related to the local recovery, the first terminal may be notified, through the first identification information, that the first packet is a packet recovered by the first node by performing the local recovery.

Figure 14:
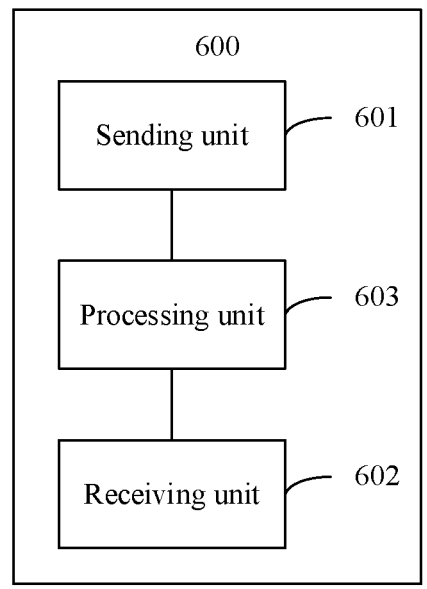
FIG. 14 is a schematic structural diagram of another communications apparatus according to this application.

Refer to FIG. 14. An embodiment of this application provides a communications apparatus 600. The apparatus 600 is deployed on a first terminal in any one of the foregoing embodiments, and includes:

a sending unit 601, configured to send at least one service packet to a second terminal; and a receiving unit 602, configured to receive a first feedback packet that is sent by the second terminal when the second terminal receives a first packet, where the first packet includes first identification information related to local recovery, the first feedback packet includes at least one of second identification information or the first identification information, the local recovery is a packet recovery mechanism implemented by a node on a network path between the apparatus and the second terminal, the first packet is a packet obtained by recovering a lost packet in the at least one service packet, and the second identification information is identification information obtained based on the first identification information.

Optionally, the first identification information is used to identify that the first packet is a packet recovered according to the local recovery mechanism, the first identification information is used to identify a quantity of times for which the first packet is recovered, or the first identification information is used to identify that a current network status indicates network congestion.

Optionally, the apparatus 600 further includes a processing unit 603.

The processing unit is configured to determine, based on the first identification information, to skip using the first feedback packet to calculate a round trip time (RTT) of the first packet.

Optionally, the receiving unit 602 is further configured to receive a second feedback packet sent by the second terminal when the second terminal receives a second packet, where the second feedback packet is used to indicate that the second packet is a falsely retransmitted packet, the second packet is sent by the apparatus when the apparatus detects that a packet in the at least one service packet is lost; and the second packet is a lost packet in the at least one service packet.

The processing unit 603 is configured to determine, based on the first identification information and the second feedback packet, that a reason why a service packet sending rate continues to decrease and/or that a reason of the falsely retransmitted packet is due to the local recovery performed on a packet lost on a network.

Optionally, a target field in a packet header of the first feedback packet includes at least one of the first identification information and the second identification information.

Optionally, the first feedback packet is an acknowledgment (ACK) packet, and in a TCP packet header of the first feedback packet, an explicit congestion experience (ECE) field, an option field, or a reserved field induces the first identification information;

the first feedback packet is an explicit congestion notification echo (ECN Echo) packet, and a congestion experience marked packet (Number CE Marked Packets) field, in the ECN Echo packet, includes the second identification information; or the first feedback packet is a real-time transport protocol/audio-visual profile with feedback (RTP/AVPF) transport layer explicit congestion notification feedback packet, and an explicit congestion experience count field of the RTP/AVPF transport layer explicit congestion notification feedback packet includes the second identification information.

In this embodiment of this application, the sending unit sends the at least one service packet. The receiving unit receives the first feedback packet that is sent by the second terminal when the second terminal receives the first packet, where the first packet includes the first identification information related to local recovery, the first feedback packet includes at least one of the second identification information or the first identification information, the local recovery is the packet recovery implemented by the node on the network path between the first terminal and the second terminal, the first packet is a packet obtained by recovering a lost packet in the at least one service packet, and the second identification information is identification information obtained based on the first identification information. The first packet is a lost packet and is a packet recovered by the node on the network path. There is no need to wait for the apparatus to resend the first packet to the second terminal, and this reduces a transmission delay. Moreover, because the first feedback packet includes at least one of the second identification information and the first identification information that is related to the local recovery, based on the first identification information and the second identification information, it may be learned that the first packet is recovered by performing the local recovery by the node on the network path.

Figure 15:
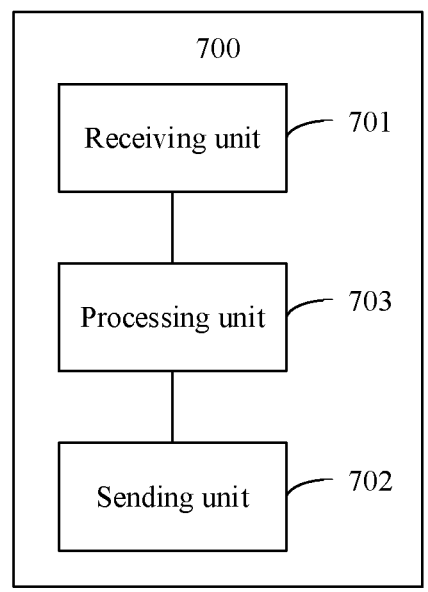
FIG. 15 is a schematic structural diagram of another communications apparatus according to this application.

Refer to FIG. 15. An embodiment of this application provides a communications apparatus 700. The apparatus 700 is deployed on a first terminal in any one of the foregoing embodiments, and includes:

a receiving unit 701, configured to receive a first packet sent by a first node, where the first packet includes first identification information related to local recovery, the first node is a node that is in at least one first terminal and on a network path between each first terminal and the apparatus, and the local recovery is packet recovery implemented by the first node; and a sending unit 702, configured to send a first feedback packet to the at least one first terminal, where the first feedback packet includes at least one of second identification information or the first identification information, and the second identification information is identification information obtained based on the first identification information.

Optionally, the first identification information is used to identify that the first packet is a packet recovered according to the local recovery mechanism, the first identification information is used to identify a quantity of times for which the first packet is recovered, or the first identification information is used to identify that a current network status indicates network congestion.

Optionally, an Internet protocol address IP packet header of the first packet includes the first identification information.

Optionally, a target field in a packet header of the first feedback packet includes at least one of the first identification information and the second identification information.

Optionally, the first feedback packet is an acknowledgment (ACK) packet, and in a TCP packet header of the first feedback packet, an explicit congestion experience (ECE) field, an option field, or a reserved field induces the first identification information;

the first feedback packet is an explicit congestion notification echo (ECN Echo) packet, and a congestion experience marked packet (Number CE Marked Packets) field, in the ECN Echo packet, includes the second identification information; or the first feedback packet is a real-time transport protocol/audio-visual profile with feedback (RTP/AVPF) transport layer explicit congestion notification feedback packet, and an explicit congestion experience count field of the RTP/AVPF transport layer explicit congestion notification feedback packet includes the second identification information.

In this embodiment of this application, the receiving unit receives the first packet sent by the first node, where the first packet includes the first identification information related to the local recovery, and the local recovery is the packet recovery implemented by the first node. The sending unit sends the first feedback packet to the at least one first terminal, where the first feedback packet includes at least one of second identification information or the first identification information, and the second identification information is identification information obtained based on the first identification information. The first packet is a lost packet and is obtained by the first node through the local recovery. There is no need to wait for the first terminal to resend the first packet to the second terminal, and this reduces a transmission delay. In addition, because the first packet includes the first identification information related to the local recovery, the first terminal may be notified, through the first identification information, that the first packet is a packet recovered by the first node by performing the local recovery.

Figure 16:
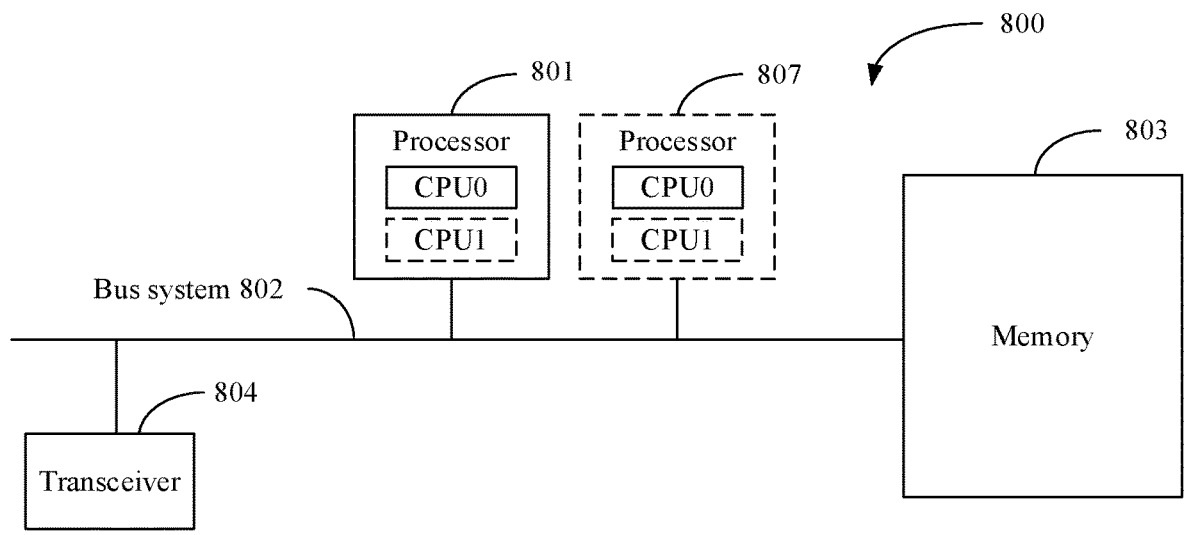
FIG. 16 is a schematic structural diagram of another communications apparatus according to this application.

Refer to FIG. 16. FIG. 16 is a schematic structural diagram of a communications apparatus 800 according to the embodiments of this application. The apparatus 800 includes at least one processor 801, a bus system 802, a memory 803, and at least one transceiver 804.

The apparatus 800 is an apparatus of a hardware structure, and may be configured to implement functional modules in the apparatus in FIG. 12. For example, a person skilled in the art may understand that the processing unit 401 in the apparatus 400 shown in FIG. 12 may be implemented by the at least one processor 801 by invoking code in the memory 803, and the receiving unit 403 and the sending unit 402 in the apparatus 400 shown in FIG. 12 may be implemented by the transceiver 804.

Optionally, the processor 801 may be a general central processing unit (CPU), a microprocessor, an application-specific integrated circuit (ASIC), or one or more integrated circuits configured to control program execution in the solutions of this application.

The bus system 802 may include a path for transmitting information between the foregoing components.

The transceiver 804 is configured to communicate with another device or a communications network.

The memory 803 may be a read-only memory (ROM), another type of static storage device that can store static information and an instruction, or random access memory (RAM), or another type of dynamic storage device that can store information and an instruction. Alternatively, the memory 803 may be an electrically erasable programmable read-only memory (EEPROM), a compact disc read-only memory (CD-ROM) or another compact disc storage, an optical disc storage (including a compact disc, a laser disc, an optical disc, a digital versatile disc, a Blu-ray optical disc, and the like), a magnetic disk storage medium or another magnetic storage device, or any other medium that can be used to carry or store expected program code in a form of an instruction or a data structure and that can be accessed by a computer. However, the memory 803 is not limited thereto. The memory may exist independently, and is connected to the processor through the bus. Alternatively, the memory may be integrated with the processor.

The memory 803 is configured to store application code for executing the solutions in this application, and the processor 801 controls the execution. The processor 801 is configured to execute the application code stored in the memory 803, to implement a function in the method in this patent.

During specific implementation, in an embodiment, the processor 801 may include one or more CPUs, for example, a CPU 0 and a CPU 1 in FIG. 16.

During specific implementation, in an embodiment, the apparatus 800 may include a plurality of processors, for example, the processor 801 and a processor 807 in FIG. 16. Each of the processors may be a single-core (single-CPU) processor or a multi-core (multi-CPU) processor. The processor herein may refer to one or more devices, circuits, and/or processing cores configured to process data (for example, a computer program instruction).

Figure 17:
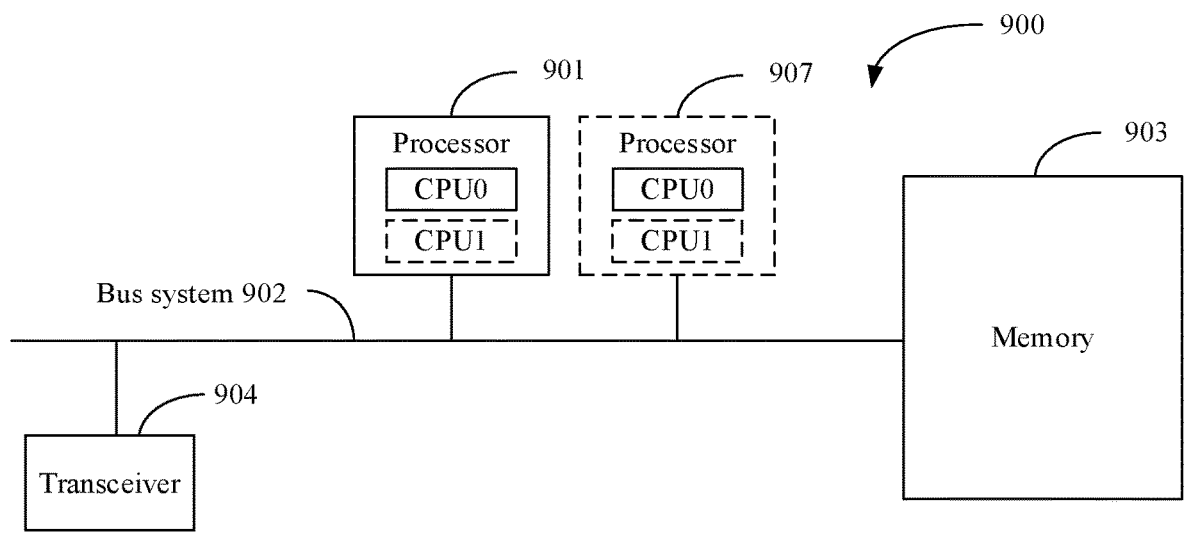
FIG. 17 is a schematic structural diagram of another communications apparatus according to this application.

Refer to FIG. 17. FIG. 17 is a schematic structural diagram of a communications apparatus 900 according to the embodiments of this application. The apparatus 900 includes at least one processor 901, a bus system 902, a memory 903, and at least one transceiver 904.

The apparatus 900 is an apparatus of a hardware structure, and may be configured to implement functional modules in the apparatus in FIG. 13. For example, a person skilled in the art may understand that the processing unit 503 in the apparatus 500 shown in FIG. 13 may be implemented by the at least one processor 901 by invoking code in the memory 903, and the receiving unit 501 and the sending unit 502 in the apparatus 500 shown in FIG. 13 may be implemented by the transceiver 904.

Optionally, the processor 901 may be a general central processing unit (CPU), a microprocessor, an application-specific integrated circuit (application-specific integrated circuit, ASIC), or one or more integrated circuits configured to control program execution in the solutions of this application.

The bus system 902 may include a path for transmitting information between the foregoing components.

The transceiver 904 is configured to communicate with another device or a communications network.

The memory 903 may be a read-only memory (ROM), another type of static storage device that can store static information and an instruction, or random access memory (RAM), or another type of dynamic storage device that can store information and an instruction. Alternatively, the memory 903 may be an electrically erasable programmable read-only memory (EEPROM), a compact disc read-only memory (CD-ROM) or another compact disc storage, an optical disc storage (including a compact disc, a laser disc, an optical disc, a digital versatile disc, a Blu-ray optical disc, and the like), a magnetic disk storage medium or another magnetic storage device, or any other medium that can be used to carry or store expected program code in a form of an instruction or a data structure and that can be accessed by a computer. However, the memory 903 is not limited thereto. The memory may exist independently, and is connected to the processor through the bus. Alternatively, the memory may be integrated into the processor.

The memory 903 is configured to store application code for executing the solutions in this application, and the processor 901 controls the execution. The processor 901 is configured to execute the application code stored in the memory 903, to implement a function in the method in this patent.

During specific implementation, in an embodiment, the processor 901 may include one or more CPUs, for example, a CPU 0 and a CPU 1 in FIG. 17.

During specific implementation, in an embodiment, the apparatus 900 may include a plurality of processors, for example, the processor 901 and a processor 907 in FIG. 17. Each of the processors may be a single-core (single-CPU) processor or a multi-core (multi-CPU) processor. The processor herein may refer to one or more devices, circuits, and/or processing cores configured to process data (for example, a computer program instruction).

Figure 18:
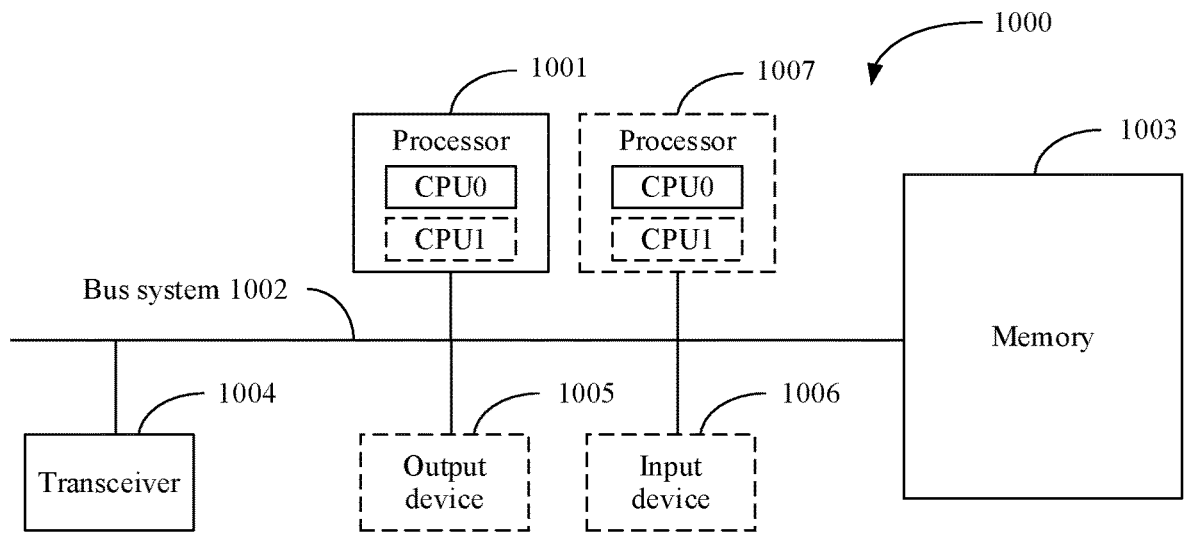
FIG. 18 is a schematic structural diagram of another communications apparatus according to this application.

Refer to FIG. 18. FIG. 18 is a schematic structural diagram of a communications apparatus 1000 according to the embodiments of this application. The apparatus 1000 includes at least one processor 1001, a bus system 1002, a memory 1003, and at least one transceiver 1004.

The apparatus 1000 is an apparatus of a hardware structure, and may be configured to implement functional modules in the apparatus in FIG. 14. For example, a person skilled in the art may understand that the processing unit 603 in the apparatus 600 shown in FIG. 14 may be implemented by the at least one processor 1001 by invoking code in the memory 1003, and the receiving unit 602 and the sending unit 601 in the apparatus 600 shown in FIG. 14 may be implemented by the transceiver 1004.

Optionally, the apparatus 1000 may be further configured to implement a function of the transmit end in any one of the foregoing embodiments.

Optionally, the processor 1001 may be a general central processing unit (CPU), a microprocessor, an application-specific integrated circuit (ASIC), or one or more integrated circuits configured to control program execution in the solutions of this application.

The bus system 1002 may include a path for transmitting information between the foregoing components.

The transceiver 1004 is configured to communicate with another device or a communications network.

The memory 1003 may be a read-only memory (ROM), another type of static storage device that can store static information and an instruction, or random access memory (RAM), or another type of dynamic storage device that can store information and an instruction. Alternatively, the memory 1003 may be an electrically erasable programmable read-only memory (EEPROM), a compact disc read-only memory (CD-ROM) or another compact disc storage, an optical disc storage (including a compact disc, a laser disc, an optical disc, a digital versatile disc, a Blu-ray optical disc, and the like), a magnetic disk storage medium or another magnetic storage device, or any other medium that can be used to carry or store expected program code in a form of an instruction or a data structure and that can be accessed by a computer. However, the memory 1003 is not limited thereto. The memory may exist independently, and is connected to the processor through the bus. Alternatively, the memory may be integrated into the processor.

The memory 1003 is configured to store application code for executing the solutions in this application, and the processor 1001 controls the execution. The processor 1001 is configured to execute the application code stored in the memory 1003, to implement a function in the method in this patent.

During specific implementation, in an embodiment, the processor 1001 may include one or more CPUs, for example, a CPU 0 and a CPU 1 in FIG. 18.

During specific implementation, in an embodiment, the apparatus 1000 may include a plurality of processors, for example, the processor 1001 and a processor 1007 in FIG. 18. Each of the processors may be a single-core (single-CPU) processor or a multi-core (multi-CPU) processor. The processor herein may refer to one or more devices, circuits, and/or processing cores configured to process data (for example, a computer program instruction).

During specific implementation, in an embodiment, the apparatus 1000 may further include an output device 1005 and an input device 1006. The output device 1005 communicates with the processor 1001, and may display information in a plurality of manners. For example, the output device 1005 may be a liquid crystal display (LCD). The input device 1006 communicates with the processor 1001, and may accept input of a user in a plurality of manners. For example, the input device 1006 may be a touchscreen device, or a sensing device.

Figure 19:
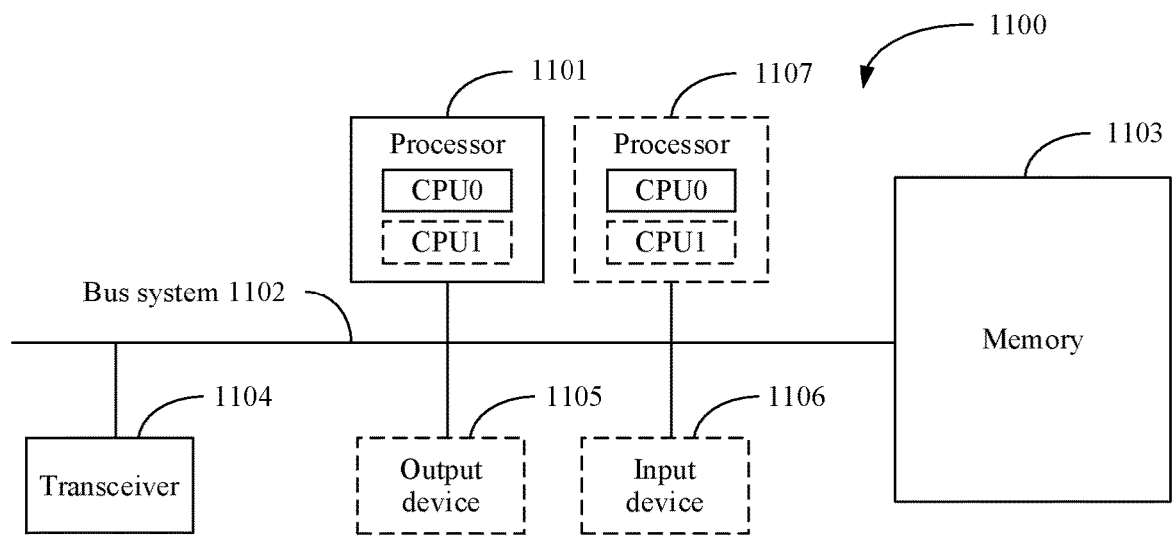
FIG. 19 is a schematic structural diagram of another communications apparatus according to this application.

Refer to FIG. 19. FIG. 19 is a schematic structural diagram of a communications apparatus 1100 according to the embodiments of this application. The apparatus 1100 includes at least one processor 1101, a bus system 1102, a memory 1103, and at least one transceiver 1104.

The apparatus 1100 is an apparatus of a hardware structure, and may be configured to implement functional modules in the apparatus in FIG. 15. For example, a person skilled in the art may understand that the processing unit 703 in the apparatus 700 shown in FIG. 15 may be implemented by the at least one processor 1101 by invoking code in the memory 1103, and the receiving unit 701 and the sending unit 702 in the apparatus 700 shown in FIG. 15 may be implemented by the transceiver 1104.

Optionally, the apparatus 1100 may be further configured to implement a function of the transmit end in any one of the foregoing embodiments.

Optionally, the processor 1101 may be a general central processing unit (CPU), a microprocessor, an application-specific integrated circuit (ASIC), or one or more integrated circuits configured to control program execution in the solutions of this application.

The bus system 1102 may include a path for transmitting information between the foregoing components.

The transceiver 1104 is configured to communicate with another device or a communications network.

The memory 1103 may be a read-only memory (ROM), another type of static storage device that can store static information and an instruction, or random access memory (random access memory, RAM), or another type of dynamic storage device that can store information and an instruction. Alternatively, the memory 1103 may be an electrically erasable programmable read-only memory (EEPROM), a compact disc read-only memory (CD-ROM) or another compact disc storage, an optical disc storage (including a compact disc, a laser disc, an optical disc, a digital versatile disc, a Blu-ray optical disc, and the like), a magnetic disk storage medium or another magnetic storage device, or any other medium that can be used to carry or store expected program code in a form of an instruction or a data structure and that can be accessed by a computer. However, the memory 1103 is not limited thereto. The memory may exist independently, and is connected to the processor through the bus. Alternatively, the memory may be integrated into the processor.

The memory 1103 is configured to store application code for executing the solutions in this application, and the processor 1101 controls the execution. The processor 1101 is configured to execute the application code stored in the memory 1103, to implement a function in the method in this patent.

During specific implementation, in an embodiment, the processor 1101 may include one or more CPUs, for example, a CPU 0 and a CPU 1 in FIG. 19.

During specific implementation, in an embodiment, the apparatus 1100 may include a plurality of processors, for example, the processor 1101 and a processor 1107 in FIG. 19. Each of the processors may be a single-core (single-CPU) processor or a multi-core (multi-CPU) processor. The processor herein may refer to one or more devices, circuits, and/or processing cores configured to process data (for example, a computer program instruction).

During specific implementation, in an embodiment, the apparatus 1100 may further include an output device 1105 and an input device 1106. The output device 1105 communicates with the processor 1101, and may display information in a plurality of manners. For example, the output device 1105 may be a liquid crystal display (LCD). The input device 1106 communicates with the processor 1101, and may accept input of a user in a plurality of manners. For example, the input device 1006 may be a touchscreen device, or a sensing device.

Figure 20:
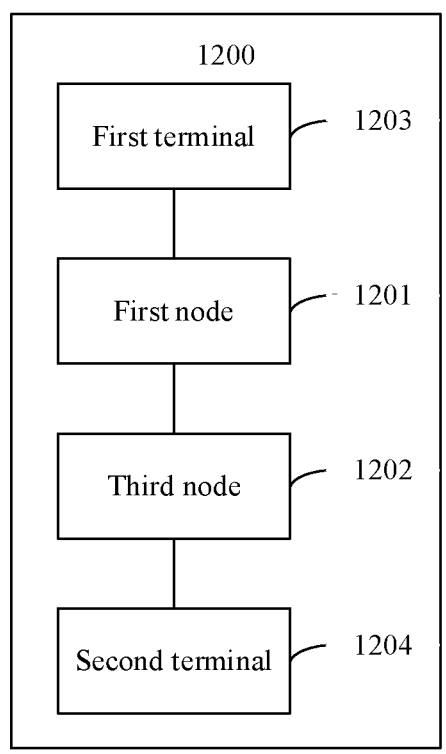
FIG. 20 is a schematic structural diagram of another communications system according to this application.

Refer to FIG. 20. An embodiment of this application provides a communications system 1200, including the apparatus shown in FIG. 12, FIG. 13, FIG. 14, and FIG. 15. Alternatively, the system includes the apparatus shown in FIG. 16, FIG. 17, FIG. 18, and FIG. 19.

The apparatus shown in FIG. 12 or FIG. 16 may be the first node 1201, the apparatus shown in FIG. 13 or FIG. 17 may be the third node 1202, the apparatus shown in FIG. 14 or FIG. 18 may be the first terminal 1203, and the apparatus shown in FIG. 15 or FIG. 19 may be the second terminal 1204.

A person of ordinary skill in the art may understand that all or some of the steps of the embodiments may be implemented by using hardware or a program instructing related hardware. The program may be stored in a computer-readable storage medium, and the storage medium may include a read-only memory, a magnetic disk, or an optical disc.

The foregoing descriptions are merely optional embodiments of this application, but are not intended to limit this application. Any modification, equivalent replacement, or improvement made without departing from the spirit and principle of this application should fall within the protection scope of this application.

What is claimed is:

1. A communications method, wherein the method comprises:

recovering, by a first node when detecting that a first packet is lost, the first packet according to a local recovery mechanism, wherein the first packet is a packet obtained based on a packet sent by a first terminal to a second terminal, and the first node is a node on a network path between the first terminal and the second terminal communicating with the first terminal;

adding, by the first node, first identification information related to local recovery to the first packet; and sending, by the first node, the first packet;

wherein the first identification information identifies that the first packet is a packet recovered according to the local recovery mechanism, the first identification information identifies a quantity of times for which the first packet is recovered, or the first identification information identifies that a current network status indicates network congestion;

wherein before the recovering, by a first node, the first packet according to a local recovery mechanism, the method further comprises:

receiving, by the first node, the first packet;

sending, by the first node, the first packet to a second node, wherein the second node is another node, other than the first node, on the network path between the first terminal and the second terminal communicating with the first terminal; and detecting, by the first node according to a packet acknowledgment mechanism, whether the first packet is lost in a process of transmitting the first packet to the second node.

2. The method according to claim 1, wherein the adding, by the first node, first identification information related to local recovery to the first packet comprises:

adding, by the first node, the first identification information to the first packet when a quantity of times for which the first packet is recovered reaches a preset quantity threshold, when network status information monitored by the first node indicates network congestion, or when a depth of a forwarding queue on the first node exceeds a preset depth threshold.

3. The method according to claim 1, wherein the first node is another node other than an edge node connected to the first terminal, and the recovering, by a first node, the first packet according to a local recovery mechanism comprises:

obtaining, by the first node, the first packet based on a received redundant packet and a received service packet, wherein the service packet and the first packet are packets obtained based on the packet sent by the first terminal to the second terminal, and the redundant packet comprises redundant information of the packet sent by the first terminal to the second terminal.

4. The method according to claim 3, wherein the adding, by the first node, first identification information related to local recovery to the first packet comprises:

adding, by the first node, the first identification information to the first packet when network status information monitored by the first node indicates network congestion, or when a depth of a forwarding queue on the first node exceeds a preset depth threshold.

5. The method according to claim 1, wherein a target field in a packet header of the first packet comprises the first identification information.

6. The method according to claim 5, wherein the packet header of the first packet comprises an outer packet header and an inner packet header, and the target field is an explicit congestion notification (ECN) field, an option field, or a reserved field in the outer packet header.

7. A communications method, wherein the method comprises:

sending, by a first terminal, at least one service packet to a second terminal; and receiving, by the first terminal, a first feedback packet that is sent by the second terminal when the second terminal receives a first packet, wherein the first packet comprises first identification information related to local recovery, the first feedback packet comprises at least one of second identification information or the first identification information, the local recovery is packet recovery implemented by a node on a network path between the first terminal and the second terminal, the first packet is a packet obtained by recovering a lost packet in the at least one service packet, and the second identification information is identification information obtained based on the first identification information.

8. The method according to claim 7, wherein the first identification information is used to indicate that the first packet is a packet recovered according to a local recovery mechanism, the first identification information is used to identify a quantity of times for which the first packet is recovered, or the first identification information is used to identify that a current network status is network congestion.

9. The method according to claim 7, wherein after the receiving, by the first terminal, a first feedback packet that is sent by the second terminal when the second terminal receives a first packet, the method further comprises:
  determining, by the first terminal, based on the first identification information, to skip using the first feedback packet to calculate a round trip time (RTT) of the first packet.

10. The method according to claim 7, wherein after the receiving, by the first terminal, a first feedback packet that is sent by the second terminal when the second terminal receives a first packet, the method further comprises:
  receiving, by the first terminal, a second feedback packet sent by the second terminal when the second terminal receives a second packet, wherein the second feedback packet is used to indicate that the second packet is a falsely retransmitted packet, the second packet is a packet sent by the first terminal when the first terminal detects that a packet in the at least one service packet is lost, and the second packet is a lost packet in the at least one service packet; and
  determining, by the first terminal, based on the first identification information and the second feedback packet, that a reason why a service packet sending rate continues to decrease and/or that a reason of the falsely retransmitted packet is due to the recovery according to the local recovery mechanism performed on a packet lost on a network.

11. The method according to claim 7, wherein a target field in a packet header of the first feedback packet comprises at least one of the first identification information or the second identification information.

12. The method according to claim 11, wherein the first feedback packet is an acknowledgment (ACK) packet, and in a TCP packet header of the first feedback packet, an explicit congestion experience (ECE) field, an option field, or a reserved field comprises the first identification information;
  the first feedback packet is an explicit congestion notification echo (ECN Echo) packet, and a congestion experience marked packet (Number CE Marked Packets) field in the ECN Echo packet comprises the second identification information; or
  the first feedback packet is a real-time transport protocol/audio-visual profile with feedback (RTP/AVPF) transport layer explicit congestion notification feedback packet, and an ECE count field of the RTP/AVPF transport layer explicit congestion notification feedback packet comprises the second identification information.

13. A communications apparatus, wherein the apparatus comprises:
  a processor, configured to recover, when detecting that a first packet is lost, the first packet according to a local recovery mechanism, wherein the first packet is a packet obtained based on a packet sent by a first terminal to a second terminal, and the apparatus is a node on a network path between the first terminal and the second terminal;
  the processor is further configured to add first identification information that is related to the local recovery mechanism to the first packet; and
  a transmitter configured to send the first packet;
  wherein the first identification information is used to indicate that the first packet is a packet recovered according to the local recovery mechanism, the first identification information is used to indicate a quantity of times for which the first packet is recovered, or the first identification information is used to indicate that a current network status is network congestion;
  wherein the apparatus further comprises a receiver configured to receive the first packet;
  wherein the transmitter is further configured to send the first packet to a second node, wherein the second node is another node, other than the apparatus, on the network path between the first terminal and the second terminal communicating with the first terminal; and
  wherein the processor is further configured to detect, according to a packet acknowledgment mechanism, whether the first packet is lost in a process of transmitting the first packet to the second node.

14. The apparatus according to claim 13, wherein the processor is configured to:
  add the first identification information to the first packet, when a quantity of times for which the first packet is recovered reaches a preset quantity threshold, when network status information monitored by the apparatus indicates network congestion, or when a depth of a forwarding queue on the apparatus exceeds a preset depth threshold.

15. The apparatus according to claim 13, wherein the apparatus is another node other than an edge node connected to the first terminal, and the processor is configured to:
  obtain the first packet according to a received redundant packet and a received service packet, wherein the service packet is obtained based on the packet sent by the first terminal to the second terminal, and the redundant packet comprises redundant information of the packet sent by the first terminal to the second terminal.

16. The apparatus according to claim 15, wherein the processor is configured to:
  add the first identification information to the first packet, when network status information monitored by the apparatus indicates network congestion, or when a depth of a forwarding queue on the apparatus exceeds a preset depth threshold.

* * * * *